(12) United States Patent
Kuzumoto et al.

(10) Patent No.: US 7,046,298 B2
(45) Date of Patent: May 16, 2006

(54) DATA SIGNAL EXTRACTION APPARATUS

(75) Inventors: Keiichi Kuzumoto, Neyagawa (JP);
Toshihiro Matsumura, Shiga (JP);
Akihiro Suzuki, Takatsuki (JP);
Atsuhisa Kageyama, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 622 days.

(21) Appl. No.: 10/400,930

(22) Filed: Mar. 28, 2003

(65) Prior Publication Data

US 2003/0184677 A1   Oct. 2, 2003

(30) Foreign Application Priority Data

Apr. 1, 2002   (JP) .............................. 2002-098933

(51) Int. Cl.
H04N 7/08   (2006.01)
H04N 7/87   (2006.01)
H04N 11/00  (2006.01)
H04N 7/00   (2006.01)

(52) U.S. Cl. ...................................... 348/465; 348/478

(58) Field of Classification Search ................ 348/365, 348/468, 461, 473, 478; H04N 7/87, 7/08, H04N 7/84, 11/00, 7/00
See application file for complete search history.

(56) References Cited

U.S. PATENT DOCUMENTS

| | | | | |
|---|---|---|---|---|
| 4,577,227 A * | 3/1986 | Gurumurthy | ................. | 348/464 |
| 5,218,437 A | 6/1993 | Sieben | ......................... | 358/147 |
| 5,371,545 A * | 12/1994 | Tults | ............................ | 348/465 |
| 5,404,172 A * | 4/1995 | Berman et al. | ............. | 348/465 |
| 6,208,383 B1 * | 3/2001 | Park | ............................ | 348/468 |
| 6,239,843 B1 * | 5/2001 | Gaudreau | .................... | 348/465 |
| 2002/0008776 A1 | 1/2002 | Kuzumoto et al. | ......... | 348/468 |

FOREIGN PATENT DOCUMENTS

JP   63215181 A   9/1988

* cited by examiner

*Primary Examiner*—Michael H. Lee
(74) *Attorney, Agent, or Firm*—Steptoe & Johnson LLP

(57) ABSTRACT

This invention provides a data signal extraction apparatus that accurately extracts data from a data signal that is serially transmitted even when phase shift or the like occurs. According to this apparatus, a phase shift amount calculation circuit 13 calculates a phase shift amount S13, then a correction amount calculation circuit 14 calculates a correction amount S14 on the basis of the phase shift amount S13, an extraction interval correction circuit 10 corrects an extraction interval value S9 on the basis of the correction amount, and an extraction pulse generation circuit 11 generates an extraction pulse S11 on the basis of a corrected extraction interval value S10, thereby extracting data from a binary signal S8 on the basis of the extraction pulse.

35 Claims, 14 Drawing Sheets

Fig.14  Prior Art

| Region | Type | Superimposition line | Transmission clock |
|---|---|---|---|
| Europe | teletext | 6~22,318~335 | 6.9375MHz |
|  | VPS | 16 | 5MHz |
|  | WSS | 23 | 5MHz |
| Japan | Text-multiplexed broadcast | 14, 15, 17, 21, 277,278,279,284 | 5.7272MHz |
| US | closed caption | 21 | 503kHz |

DATA SIGNAL EXTRACTION APPARATUS

FIELD OF THE INVENTION

The present invention relates to data extraction apparatuses that extract predetermined data from serially transmitted signals and, more particularly, to a text broadcast data extraction apparatus that extracts text data in text broadcast which are transmitted, using a vertical blanking interval of a video signal.

BACKGROUND OF THE INVENTION

As a method for transmitting data with serial transmission, there is a well-known text broadcast system that transmits text broadcast data using a vertical blanking interval of a video signal.

In various regions across the world, text broadcast data that are superimposed upon a vertical blanking interval of a video signal are transmitted. FIG. 14 shows a table indicating the relationships among the types of text broadcast, the superimposition lines on which text broadcast data are superimposed, and the transmission clocks in the respective regions.

Conventionally, a text broadcast data extraction apparatus as shown in FIG. 13 has been employed to extract text broadcast data from a video signal including the text broadcast data superimposed thereon. Hereinafter, the conventional text broadcast data extraction apparatus will be described with reference to FIG. 13.

In FIG. 13, an analog video signal S1301 including text broadcast data superimposed upon a vertical blanking interval is inputted through a video signal input terminal 1301. An A/D converter 1302 converts the analog video signal S1301 into a digital video signal S1302. A low-pass filter (LPF) 1303 subjects the digital video signal S1302 to noise elimination. A sync separation circuit 1304 separates a horizontal synchronizing signal S1304a and a vertical synchronizing signal S1304b from the digital video signal S1302. A slice level calculation circuit 1305 calculates an optimum slice level S1305 for the signal S1303 that has been subjected to the noise elimination, on the basis of the horizontal synchronizing signal S1304a and the vertical synchronizing signal S1304b. A binarization circuit 1306 converts the signal S1303 that has subjected to the noise elimination, into a binary signal S1306 based on the slice level S1305. A PLL circuit 1307 generates an extraction clock S1307 that is synchronized with a clock run-in (CRI). A controller 1308 controls the PLL circuit 1307. An extraction circuit 1309 extracts the text broadcast data S1309 from the binary signal S1306, in accordance with the extraction clock S1307. A decoder circuit 1310 carries out a decoding process to the text broadcast data S1309. A decoded signal S1310 is outputted through an output terminal 1311.

The operation of the conventional text broadcast extraction apparatus that is constructed as described above will be described.

When an analog video signal S1301 including text broadcast data superimposed upon a vertical blanking interval is inputted through the video signal input terminal 1301, the analog video signal S1301 is sampled based on a sampling clock fs (MHz) by the A/D converter 1302, to be converted into a digital video signal S1302. The obtained digital video signal S1302 is inputted to the LPF 1303 and the sync separation circuit 1304.

The digital video signal S1302 inputted to the LPF 1303 is subjected to noise elimination, and outputted to the binarization circuit 1306.

On the other hand, a horizontal synchronizing signal (HSYNC) S1304a and a vertical synchronizing signal (VSYNC) S1304b are separated from the digital video signal S1302 inputted to the sync separation circuit 1304, and the separated signals S1304a and S1304b are inputted to the slice level calculation circuit 1305. Then, the slice level calculation circuit 1305 calculates an optimum slice level S1305 for text broadcast data in a predetermined line and a predetermined position of the digital video signal S1303 that has been subjected to the noise elimination, on the basis of the horizontal synchronizing signal S1304a and the vertical synchronizing signal S1304b, and outputs the obtained slice level S1305 to the binarization circuit 1306.

The binarization circuit 1306 converts the signal S1303 outputted from the LPF 1303 into a binary signal that is composed 0 and 1, based on the slice level S1305 calculated by the slice level calculation circuit 1305.

The PLL circuit 1307 establishes synchronization of an extraction clock having the same cycle as that of a transmission clock during a CRI period in the vertical blanking interval, for establishing synchronization between a text broadcast signal and the extraction clock, to generate an extraction clock S1307 that is synchronized with CRI. The extraction circuit 1309 extracts text broadcast data S1309 from the binary signal S1306 utilizing the extraction clock S1307, and the decoding circuit 1310 carries out a decoding process depending on the type of the text broadcast such as error correction. Then, the data S1310 decoded by the decoder circuit 1310 is inputted to a display circuit (not shown) through the output terminal 1311, and the display according to the type of the text broadcast is realized.

However, in the conventional text broadcast extraction apparatus, when the signal is out of phase at some point of the line due to group delay or the like at the extraction of text broadcast data, which is performed utilizing the extraction clock S1307 generated by the PLL circuit 1307 and synchronized with CRI, the text data gets out of phase, thereby causing an extraction error.

To suppress the group delay, a multi-tap filter, i.e., a filter for performing high-order waveform equalization is required, while this filter has such a large circuit scale that the whole circuit scale of the apparatus is adversely increased.

SUMMARY OF THE INVENTION

The present invention provides a data signal extraction apparatus that does not cause an extraction error in a text broadcast signal also when phase shift occurs at some point of the line of the text broadcast signal.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a data signal extraction apparatus that extracts a predetermined data signal from an inputted video signal that is serially transmitted from outside, comprising: an A/D conversion unit for sampling the inputted video signal based on a sampling clock of a predetermined frequency, to be converted into a digital video signal; a slice level calculation unit for calculating a slice level that is used to evaluate a value of the inputted video signal as 0 or 1, on the basis of the digital video signal; a binarization unit for converting the digital video signal into a binary signal using the slice level; an extraction interval calculation unit for calculating an extraction interval value to extract the predetermined data signal from the digital video signal; a zero-crossing point detection unit for detecting a zero-crossing point at which the binary signal changes from 0 to 1, or from 1 to 0; a phase shift amount calculation unit for calculating an amount of phase shift in the data signal, on the basis of the zero-crossing point; a correction amount calculation unit for calculating an amount of correction for the extraction interval value, according to the phase shift amount; an extraction interval correction unit for correcting the extraction interval value according to the correction amount, to obtain a corrected extraction interval value; an extraction pulse generation unit for calculating a position of the data signal in the binary signal successively from a predetermined extraction position, being spaced at intervals that are close to the corrected extraction interval value, and generating an extraction pulse designating the position of the data as a data extraction position; and an extraction unit for extracting the data signal from the binary signal in accordance with the extraction pulse. Therefore, when the signal is shifted in phase in the middle, the phase shift amount can be calculated instantaneously, and the extraction interval value is adjusted according to the calculated phase shift amount to generate the extraction pulse at an optimum position. Consequently, this data signal extraction apparatus can extract data from a signal including distortion in the transmission system due to group delay or the like with high accuracy, without increasing the circuit scale.

According to a 2nd aspect of the present invention, the data signal extraction apparatus of the 1st aspect further includes: a CRI detection unit for detecting a period of clock run-in in the digital video signal; and a text broadcast system detection unit for calculating a clock run-in cycle of the inputted video signal during the clock run-in period, and detecting a type of a text broadcast system of the inputted video signal on the basis of the calculated cycle, in which apparatus the extraction interval calculation unit calculates the extraction interval value on the basis of the detected type of the text broadcast system. Therefore, not only European teletext broadcast but also VPS, WSS, Japanese text-multiplexed broadcast, Electric Program Guides (abbreviated as EPG), US closed caption broadcast can be adaptively extracted, thereby realizing the data signal extraction apparatus conforming to global text broadcast systems.

According to a 3rd aspect of the present invention, there is provided a data signal extraction apparatus that extracts a predetermined data signal from an inputted video signal that is serially transmitted from outside, comprising: an A/D conversion unit for sampling the inputted video signal based on a sampling clock of a predetermined frequency, to be converted into a digital video signal; a slice level calculation unit for calculating a slice level that is used to evaluate the inputted video signal as 0 or 1, on the basis of the digital video signal; a binarization unit for converting the digital video signal into a binary signal using the slice level; an extraction interval calculation unit for calculating an extraction interval value to extract the predetermined data signal from the digital video signal; a zero-crossing point detection unit for detecting a zero-crossing point at which the binary signal changes from 0 to 1, or from 0 to 1; a counter unit for counting the number of the sampling clocks; a counter value capture unit for capturing a count value of the counter unit in response to the detection of the zero-crossing point; an arithmetic unit for calculating an amount of phase shift in the signal using the counter value that is captured by the counter value capture unit and the extraction interval value, and correcting the extraction interval value on the basis of the phase shift amount; a comparison unit for comparing a result of the arithmetic by the arithmetic unit and the counter value of the counter unit with each other; an extraction pulse generation unit for extracting an extraction pulse on the basis of an output from the comparison unit; and an extraction unit for extracting the predetermined data signal from the binary signal, in accordance with the extraction pulse. Therefore, when the signal is shifted in phase in the middle, the phase shift amount is calculated instantaneously, and the extraction interval value is adjusted according to the phase shift amount to generate the extraction pulse at an optimum position. Consequently, this data signal extraction apparatus can extract data from a signal including distortion in the transmission system due to group delay or the like with high accuracy, without increasing the circuit scale.

According to a 4th aspect of the present invention, the data signal extraction apparatus of the 3rd aspect further includes: a CRI detection unit for detecting a period of clock run-in in the digital video signal; and a text broadcast system detection unit for calculating a clock run-in cycle of the inputted video signal during the clock run-in period, and detecting a type of a text broadcast system of the inputted video signal on the basis of the calculated cycle, in which apparatus the extraction interval calculation unit calculates the extraction interval value on the basis of the detected type of the text broadcast system. Therefore, not only European teletext broadcast but also VPS, WSS, Japanese text-multiplexed broadcast, Electric Program Guides (abbreviated as EPG), and US closed caption broadcast can be adaptively extracted, thereby realizing the data signal extraction apparatus conforming to global text broadcast systems.

According to a 5th aspect of the present invention, there is provided a data signal extraction apparatus that extracts a predetermined data signal from an inputted video signal that is serially transmitted from outside, comprising: an A/D conversion unit for sampling the inputted video signal based on a sampling clock of a predetermined frequency, to be converted into a digital video signal; a slice level calculation unit for calculating a slice level that is used to evaluate the inputted video signal as 0 or 1, on the basis of the digital video signal; a binarization unit for converting the digital video signal into a binary signal using the slice level; a storage unit for storing the binary signal; an extraction interval calculation unit for calculating an extraction interval value to extract the predetermined data signal from the digital video signal; a zero-crossing point address detection unit for detecting an address of a zero-crossing point at which the binary signal stored in the storage unit changes from 0 to 1, or from 1 to 0; an address calculation unit for calculating an extraction address corresponding to the predetermined data signal, in the binary signal stored in the storage unit, on the basis of the extraction interval value; an initial address calculation unit for calculating an initial address using the zero-crossing point address and the extraction interval value; an address correction value calculation unit for calculating an address correction value to correct the extraction address when phase shift occurs in the inputted video signal; and an address correction unit for correcting the extraction address obtained by the address calculation unit, on the basis of the address correction value, in which apparatus the storage unit extracts the predetermined data signal from the stored digital video signal, on the basis of the extraction address corrected by the address correction unit. Therefore, when the signal is shifted in phase in the middle, the phase shift is instantaneously detected, then the phase shift is corrected using the address correction value, and data at an optimum position in the digital video signal that is stored in the storage unit such as a RAM can be extracted on the basis of the address correction value. Consequently, this data signal extraction apparatus can extract data from a signal including distortion in the transmission system due to group delay or the like with high accuracy, without increasing the circuit scale.

According to 6th aspect of the present invention, the data signal extraction apparatus of the 5th aspect further includes: a CRI detection unit for detecting a period of clock run-in in the digital video signal; a CRI address calculation unit for calculating a start address and an end address of the clock run-in period; and a text broadcast system detection unit for calculating a clock run-in cycle of the inputted video signal during the clock run-in period, and detecting a type of a text broadcast system of the inputted video signal on the basis of the calculated cycle, in which the initial address calculation unit calculates an initial address of the zero-crossing point in the clock run-in period on the basis of the addresses outputted from the CRI address calculation unit, and the extraction interval calculation unit calculates the extraction interval value according to the detected type of the text broadcast system. Therefore, not only European teletext broadcast but also VPS, WSS, Japanese text-multiplexed broadcast, Electric Program Guides (abbreviated as EPG), and US closed caption broadcast can be adaptively extracted, thereby realizing a data signal extraction apparatus conforming to global text broadcast systems.

According to 7th aspect of the present invention, there is provided a data signal extraction apparatus that extracts a predetermined data signal from an inputted video signal that is serially transmitted from outside, comprising: an A/D conversion unit for sampling the inputted video signal based on a sampling clock of a predetermined frequency, to be converted into a digital video signal; an interpolation unit for interpolating the digital video signal so as to multiply the amount of data by α (α is an integer), thereby generating interpolated data; a slice level calculation unit for calculating a slice level that is used to evaluate the inputted video signal as 0 or 1, on the basis of the digital video signal; a binarization unit for converting the digital video signal and the interpolated data into binary signals using the slice level; an extraction interval calculation unit for calculating an extraction interval value to extract the predetermined data signal from the digital video signal; a zero-crossing point detection unit for detecting a zero-crossing point at which the binary signal of the digital video signal or the binary signal of the interpolated data change from 0 to 1, or from 1 to 0; a phase shift amount calculation unit for calculating an amount of phase shift in the data signal, on the basis of the zero-crossing point; a correction amount calculation unit for calculating an amount of correction for the extraction interval value, according to the phase shift amount; an extraction interval correction unit for correcting the extraction interval value on the basis of the correction amount, to obtain a corrected extraction interval value; an extraction pulse generation unit for calculating a position of the data signal in the binary signal of the digital video signal or the binary signal of the interpolated data successively from a predetermined extraction position, being spaced at intervals that are close to the corrected extraction interval value, and generating an extraction pulse designating the position of the data signal as a data extraction position; a data selection pulse generation unit for generating a data selection pulse on the basis of the corrected extraction interval value, to select one of the binary signal of the digital video signal and the binary signal of the interpolated data; a data selection unit for selecting one of the binary signals in accordance with the data selection pulse; and an extraction unit for extracting the data signal from the binary signal selected by the data selection unit, in accordance with the extraction pulse. Therefore, when the signal is shifted in phase in the middle, the phase shift amount is calculated instantaneously, and the extraction interval value is adjusted according to the phase shift amount to generate the extraction pulse at an optimum position. Consequently, this data signal extraction apparatus can extract data from a signal including distortion in the transmission system due to group delay or the like with high accuracy, without increasing the circuit scale.

According to an 8th aspect of the present invention, the data signal extraction apparatus of the 7th aspect further includes: a CRI detection unit for detecting a period of clock run-in of the digital video signal; and a text broadcast system detection unit for calculating a clock run-in cycle of the inputted video signal during the clock run-in period, and detecting a type of a text broadcast system of the inputted video signal on the basis of the calculated cycle, in which apparatus this extraction interval calculation unit calculates the extraction interval value according to the detected type of the text broadcast system. Therefore, not only European teletext broadcast but also VPS, WSS, Japanese text-multiplexed broadcast, Electric Program Guides (abbreviated as EPG), and US closed caption can be adaptively extracted, thereby realizing a data signal extraction apparatus conforming to global text broadcast systems.

According to a 9th aspect of the present invention, there is provided a data signal extraction apparatus that extracts a predetermined data signal from an inputted video signal that is serially transmitted from outside, comprising: an A/D conversion unit for sampling the inputted video signal based on a sampling clock of a predetermined frequency, to be converted into a digital video signal; a slice level calculation unit for calculating a slice level that is used to evaluate the inputted video signal as 0 or 1 on the basis of the digital video signal; a binarization unit for converting the digital video signal into a binary signal using the slice level; an extraction interval calculation unit for calculating an extraction interval value to extract the data signal from the digital video signal; a zero-crossing point position detection unit for detecting a zero-crossing point position at which the digital video signal intersects the slice level, using the digital video signal and the slice level; a phase shift amount calculation unit for calculating an amount of phase shift in the data signal on the basis of the zero-crossing point position; a correction amount calculation unit for calculating an amount of correction for the extraction interval value according to the phase shift amount; an extraction interval correction unit for correcting the extraction interval value on the basis of the correction amount, to obtain a corrected extraction interval value; an extraction pulse generation unit for calculating a positions of the data signal in the binary signal successively from a predetermined extraction position, spaced at intervals that are close to the corrected extraction interval value, and generating an extraction pulse designating the position of the data signal as a data extraction position; and an extraction unit for extracting the data signal from the binary signal in accordance with the extraction pulse. Therefore, when the signal is shifted in phase in the middle, the phase shift amount is instantaneously calculated, and the extraction interval value is adjusted according to the phase shift amount to generate the extraction pulse at an optimum position. Consequently, this data signal extraction apparatus can extract data from a signal including distortion in the transmission system due to group delay or the like with high accuracy, without increasing the circuit scale.

According to a 10th aspect of the present invention, the data signal extraction apparatus of the 9th aspect of the present invention further includes: a CRI detection unit for detecting a period of clock run-in in the digital video signal; and a text broadcast system detection unit for calculating a clock run-in cycle of the inputted video signal during the clock run-in period, and detecting a type of a text broadcast system of the inputted video signal on the basis of the calculated cycle, in which the extraction interval calculation unit calculates the extraction interval value according to the detected type of the text broadcast system. Therefore, not only European teletext broadcast but also VPS, WSS, Japanese text-multiplexed broadcast, Electric. Program Guides (abbreviated as EPG), and US closed caption broadcast can be adaptively extracted, thereby realizing a data signal extraction apparatus conforming to global text broadcast systems.

BRIEF DESCRIPTION OF THE DRAWINGS

FIG. 14 is a table that indicates the types of text broadcast, for explaining the conventional data signal extraction apparatus.

DETAILED DESCRIPTION OF THE PREFERRED EMBODIMENTS

Hereinafter, embodiments of the present invention will be described with reference to the drawings. The embodiments shown herein are exemplary only and the present invention is not restricted to these embodiments.

Embodiment 1

A data signal extraction apparatus according to a first embodiment of the present invention will be described with reference to FIGS. 1 and 2.

Figure 1:
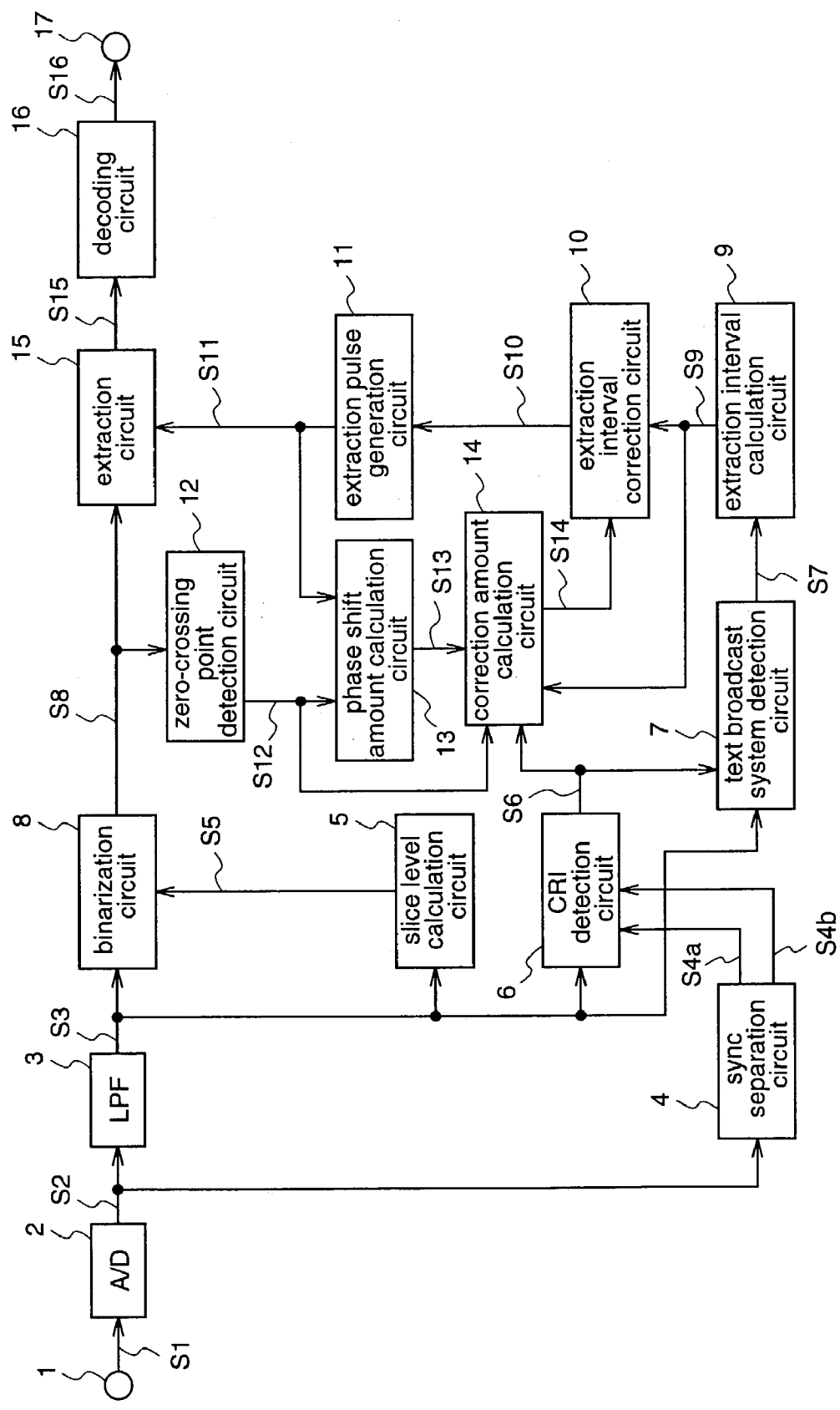
FIG. 1 is a block diagram illustrating a construction of a data signal extraction apparatus according to a first embodiment of the present invention.

FIG. 1 is a block diagram illustrating a construction of the data signal extraction apparatus according to the first embodiment.

In FIG. 1, an analog video signal S1 including text broadcast data superimposed upon a vertical blanking interval is inputted through a video signal input terminal 1.

An A/D converter 2 samples the analog video signal S1 based on a predetermined sampling clock fs (MHz) to be converted into a digital video signal S2, and outputs the digital video signal S2 into a low-pass filter (LPF) 3 and a sync separation circuit 4.

The LPF 3 subjects the inputted digital video signal S2 to noise elimination, and outputs the processed signal S3 to a slice level calculation circuit 5, a clock run-in (CRI) detection circuit 6, and a binarization circuit 8.

The sync separation circuit 4 separates a horizontal synchronizing signal S4a and a vertical synchronizing signal S4b from the inputted digital video signal S2, and outputs the separated synchronizing signals S4a and S4b to the CRI detection circuit 6. Here, the horizontal synchronizing signal S4a and the vertical synchronizing signal S4b are employed to detect positions of a CRI period and the like.

The slice level calculation circuit 5 calculates an optimum slice level for text broadcast data in a predetermined line and a predetermined position of the digital video signal S3 that has been subjected to the noise elimination, and outputs the calculated slice level to the binarization circuit 8.

The CRI detection circuit 6 detects the position of the CRI period in the digital video signal S3 that has been subjected to the noise elimination, utilizing the horizontal synchronizing signal S4a and the vertical synchronizing signal S4b, and outputs a CIR detection signal S6 to a text broadcast system detection circuit 7 and a correction amount calculation circuit 14.

The text broadcast system detection circuit 7 calculates the CRI cycle of the digital video signal S3 that has been subjected to the noise elimination, in accordance with the CRI detection signal S6, then determines the type of the text broadcast system on the basis of the calculated cycle, and outputs a text broadcast system pulse S7 to an extraction interval calculation circuit 9 as.

The binarization circuit 8 converts the digital video signal S3 that has been subjected to the noise elimination, into a binary signal S8 being composed of 0 and 1, based on the slice level S5 calculated by the slice level calculation circuit 5, and outputs the binary signal S8 to an extraction circuit 15 and a zero-crossing point detection circuit 12.

The extraction interval calculation circuit 9 calculates an optimum extraction interval data S9 on the basis of the text broadcast system pulse S7, and outputs the extraction interval data S9 to an extraction interval correction circuit 10 and an correction amount calculation circuit 14. This extraction interval data S9 can be calculated from a ratio between the sampling clock fs and a transmission clock of various text broadcast systems. In other words, the extraction interval data S9 can be obtained when the type of the text broadcast system and the frequency of the sampling clock are obtained. Here, a unit of the extraction interval data S9 is the number of the sampling clocks.

The extraction interval correction circuit 10 corrects the extraction interval data S9 in accordance with correction amount data S14, and outputs corrected extraction interval data S10 to an extraction pulse generation circuit 11.

The extraction pulse generation circuit 11 generates an extraction pulse S11 at an optimum position on the basis of the corrected extraction interval data S10, and outputs the generated pulse S11 to the extraction circuit 15 and a phase shift amount calculation circuit 13.

The zero-crossing point detection circuit 12 detects a zero-crossing point at which the binary signal S8 changes from 0 to 1 or from 1 to 0, and outputs a zero-crossing point pulse S12 to the phase shift amount calculation circuit 13 and the correction amount calculation circuit 14.

The phase shift amount calculation circuit 13 calculates phase shift amount data S13 from a phase difference between the zero-crossing point pulse S12 outputted from the zero-crossing point detection circuit 12 and the extraction pulse S11 outputted from the pulse generation circuit 11, and outputs the calculated phase shift amount data S13 to the correction amount calculation circuit 14. Here, a unit of the phase shift amount data S13 is the number of sampling clocks.

The correction amount calculation circuit 14 calculates correction amount data S14 for the extraction interval according to the phase shift amount data S13 outputted from the phase shift amount calculation circuit 13, and outputs the calculated data S14 to the extraction interval correction circuit 10.

Here, the correction amount data S14 that is calculated according to the phase shift amount data S13 is calculated in following steps.

In the case of a normal signal including no phase delay or phase lead, a phase difference between the zero-crossing point pulse S12 and the extraction pulse S11, i.e., the phase shift amount data S13 has a value that is one half the extraction interval data S9. When the signal is delayed in phase, the phase shift amount data S13 has a value that is larger than one-half the extraction interval data S9. On the other hand, when the signal is leaded in phase, the phase shift amount data S13 has a value that is smaller than one-half the data S9. Therefore, the correction amount calculation circuit 14 subtracts the phase shift amount data S13 from a value of one-half the extraction interval data S9, thereby to calculate the correction amount data S14. Accordingly, when the correction amount data S14 has a positive number it is found that the signal is delayed in phase, while when the data S14 has a negative number it is found that the signal leaded in phase.

Here, when the correction amount data S14 is calculated by subtracting one-half the extraction interval data S9 from the phase shift data S13, the difference is only that the signal is leaded in phase when the correction amount data S14 has a positive number while the signal is delayed in phase when the data S14 has a negative number.

The correction amount calculation circuit 14 may be configured for example by a lookup table, such as a RAM, which varies according to the phase shift amount data S13. For example, when the correction amount is outputted in response to the input of the phase shift amount, the same effect can be achieved.

The extraction circuit 15 extracts the text broadcast data S15 from the binary signal S8 in accordance with the extraction pulse S11, and outputs the extracted data S15 to a decoding circuit 16.

The decoding circuit 16 converts the serial text broadcast data S15 extracted by the extraction circuit 15 into parallel data, then subjects the parallel data to a decoding process depending on the type of the text broadcast such as error correction, and outputs the decoded data S16 to outside through an output terminal 17.

The operation of the data signal extraction apparatus according to the first embodiment, which is constructed as described above, will be described with reference to FIG. 2. It is assumed here that the type of text broadcast data is teletext broadcast.

Figure 2:
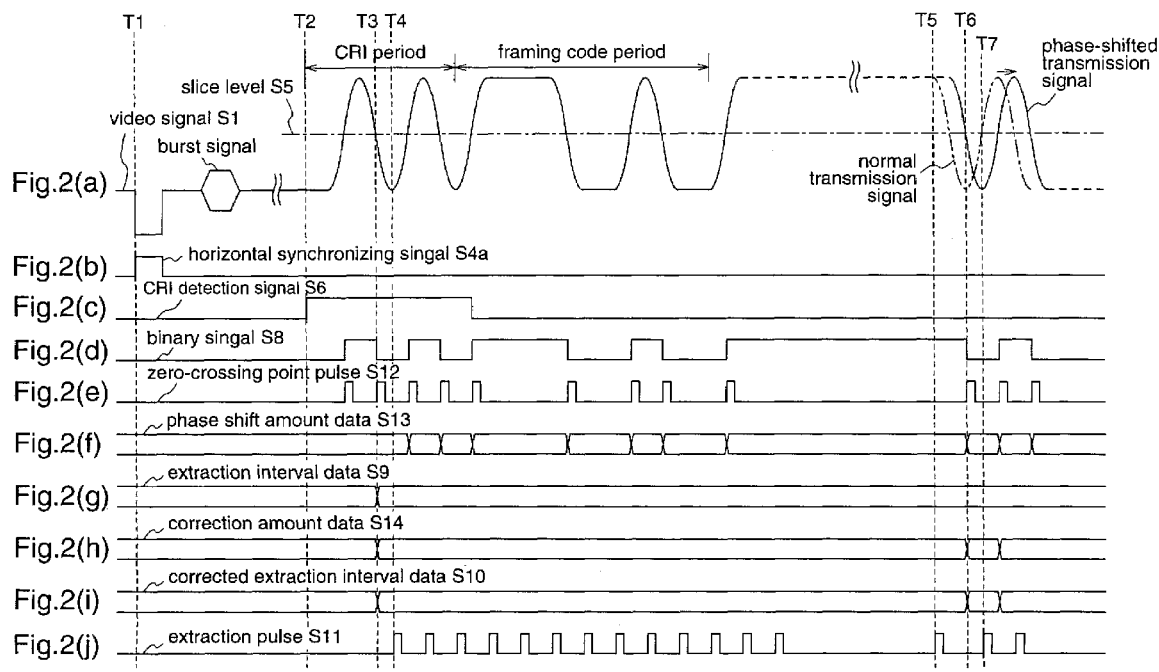
FIGS. 2(a) to 2(j) are timing charts for explaining an operation of the data signal extraction apparatus according to the first embodiment.

FIG. 2 are timing charts for explaining the operation of the data signal extraction apparatus according to the first embodiment. FIG. 2(a) shows an analog video signal S1, FIG. 2(b) shows a horizontal synchronizing signal S4a, FIG. 2(c) shows a CRI detection signal S6, FIG. 2(d) shows a binary signal S8, FIG. 2(e) shows a zero-crossing point pulse S12, FIG. 2(f) shows phase shift amount data S13, FIG. 2(g) shows extraction interval data S9, FIG. 2(h) shows correction amount data S14, FIG. 2(i) shows corrected extraction interval data S10, and FIG. 2(j) shows an extraction pulse S11.

An analog video signal S1 that is inputted through the video signal input terminal 1 includes, as shown in FIG. 2(a), a horizontal synchronizing signal, a burst signal, a CRI period, a framing code period indicating the type of text broadcast and the like, and text broadcast data.

At time T1, a horizontal synchronizing signal S4a as shown in FIG. 2(b) is separated by the sync separation circuit 4 from a digital video signal S2 that is obtained by digitizing the analog video signal S1 in the A/D converter 2.

At time T2, a CRI period is detected by the CRI detection circuit 6 from a signal S3 that is obtained by subjecting the digital video signal S2 to noise elimination by means of the LPF 3, thereby generating a CRI detection signal S6 shown in FIG. 2(c). In addition, the signal S3 that is obtained by the noise elimination is binarized by the binarization circuit 8 based on the slice level S5 calculated by the slice level calculation circuit 5, thereby generating a binary signal S8 as shown in FIG. 2(d), which has a value of 1 when the signal S3 is higher than the slice level S5 while having a value of 0 when the signal S3 is lower than the slice level S5. Then, a pulse indicating a zero-crossing point at which the binary signal S8 changes from 0 to 1 or from 1 to 0 is detected by the zero-crossing point detection circuit 12, thereby to generate a zero-crossing point pulse S12 as shown in FIG. 2(e).

At time T3, the number of clocks between zero-crossing point pulses S12, i.e., the cycle, is calculated during a period in which the CRI detection signal S6 is 1, and when the calculated cycle matches for example the text broadcast system of teletext broadcast, the extraction interval calculation circuit 9 generates extraction interval data S9 shown in FIG. 2(g).

At time T4, the extraction pulse generation circuit 11 generates an extraction pulse S11 as shown in FIG. 2(j) at a position corresponding to one-half the extraction interval data starting from the zero-crossing point pulse S12. In addition, the phase shift amount calculation circuit 13 calculates the phase difference between the zero-crossing point pulse S12 shown in FIG. 2(e) and the extraction pulse S11 shown in FIG. 2(j) at each detection of the zero-crossing pulse S12, thereby obtaining phase shift amount data as shown in FIG. 2(f). When waveform distortion such as phase shift does not occur in the video signal S1 including text broadcast data superimposed thereon, the phase shift amount data S13 has the same value as one-half the extraction interval data S9. In other words, when the correction amount calculation circuit 14 calculates the correction amount data S14 by subtracting one-half the extraction interval data S9 from the phase shift amount data S13, the correction amount data S14 shown in FIG. 2(h) has a value of 0. Therefore, no phase shift occurs from time T4 to time T5, and accordingly the extraction pulse S11 as shown in FIG. 2(j) is generated starting from the extraction pulse that is generated at time T4, at intervals of the extraction interval data S9.

When the phase shift occurs at time T5 due to a group delay or the like, data S13 of the phase shift amount between the extraction pulse S11 at time T5 and the zero-crossing point pulse S12 at time T6 is not equal to one-half the extraction interval data S9 but has a value that is shifted by several clocks.

The correction amount calculation circuit 14 calculates the amount of correction on the basis of the phase shift amount data S13. It is assumed here that a value of one-half the extraction interval data S9 (hereinafter, referred to as a normal value) is øn, and a difference value that is obtained by subtracting the normal value øn from the phase shift amount data S13 is the correction amount data S14, the phase shift amount data S13 is larger than the normal value øn in the case of phase delay, and thus the correction amount has a positive number. In the case of phase lead, the phase shift amount data S13 is smaller than the normal value øn, and thus the correction amount has a negative number.

When the corrected extraction interval data S10 is obtained by adding the thus-obtained correction amount data S14 to the extraction interval data S9, in the case of the phase delay as shown in FIG. 2, the corrected extraction interval data S10 is larger than the extraction interval data S9, and the extraction pulse S11 is generated as time T7. Accordingly, even when the inputted video signal is delayed in phase, the extraction interval is corrected to correct the amount of phase delay at time T7, thereby correctly extracting text broadcast data S15 from the inputted video signal without causing an extraction error in the extraction circuit 15.

The extracted text broadcast data S15 is decoded by the decoding circuit 16 and outputted to a display circuit (not shown). Thus, the display depending on the type of the text broadcast can be realized.

Here, the phase delay has been described with reference to FIG. 2, while in the case of phase lead the corrected extraction interval data S10 is smaller than the extraction interval data S9, and thus extraction of text broadcast data from the inputted video signal can be correctly performed by correcting the amount of the phase lead.

In the above description of FIG. 2, the correction amount is obtained by subtracting the normal value øn from the phase shift amount data S13, while the same effect can be achieved also when the correction amount is calculated by subtracting the phase shift amount data S13 from the normal value øn, and then the corrected extraction interval data S10 is obtained by subtracting the calculated correction amount from the extraction interval data S9.

Further, also in cases where the text broadcast signal is not a teletext signal, the correct extraction can be performed in the above-mentioned manner, i.e., by determining the type of the text broadcast, then calculating the extraction interval data S9 according to the determined type, and correcting the extraction interval adaptively when phase shift occurs.

In the data signal extraction apparatus according to the first embodiment, when phase shift occurs in the inputted video signal S1 that is serially transmitted from outside, the phase shift amount S13 is calculated instantaneously, and then the extraction interval data S9 is corrected on the basis of the phase shift amount S13, thereby generating the extraction pulse S11. Therefore, when the inputted video signal is shifted in phase in the midstream, the phase shift amount can be detected instantaneously, thereby generating an extraction pulse at an optimum position. Consequently, the correct extraction can be performed to a signal including distortion in the transmission system due to group delay or the like with a simple circuit construction, without the need of a large-scaled circuit such as a waveform equalizer.

In addition, this data signal extraction apparatus determines the type of the text broadcast system, and generates an extraction pulse on the basis of the type and the frequency of the sampling clock. Therefore, not only European teletext broadcast but also VPS, WSS, Japanese text-multiplexed broadcast, Electric Program Guides (abbreviated as EPG), and US closed caption broadcast can be adaptively extracted, whereby the data signal extraction apparatus according to the first embodiment can handle global text broadcast systems.

Embodiment 2

A data signal extraction apparatus according to a second embodiment of the present invention will be described with reference to FIGS. 3 and 4.

Figure 3:
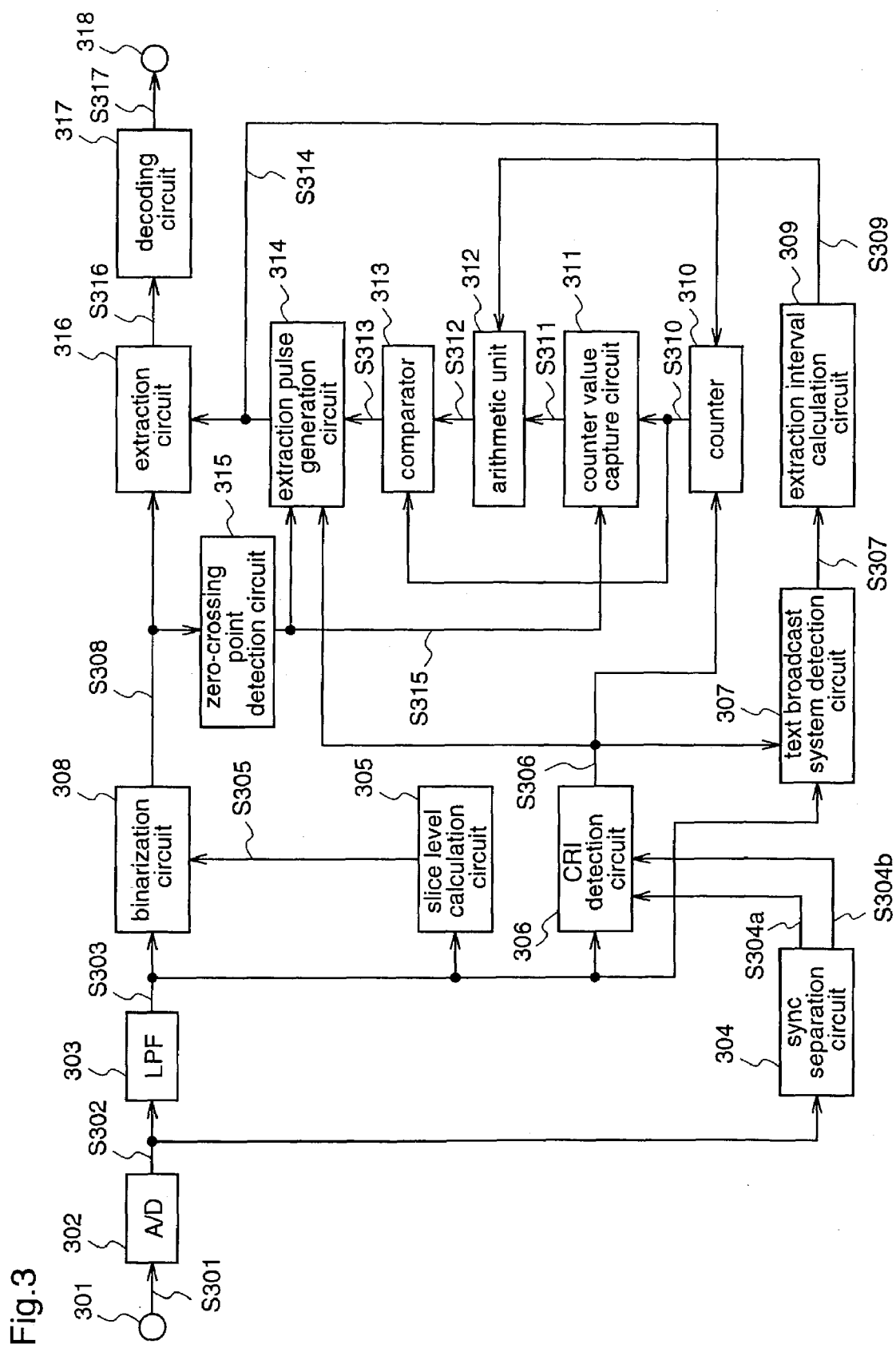
FIG. 3 is a block diagram illustrating a construction of a data signal extraction apparatus according to a second embodiment of the present invention.

FIG. 3 is a block diagram illustrating a construction of the data signal extraction apparatus according to the second embodiment.

In FIG. 3, an analog video signal S301 including text broadcast data which are superimposed upon a vertical blanking interval is inputted through a video signal input 301.

An A/D converter 302 samples the analog video signal S301 based on a predetermined sampling clock fs (MHz) to be converted into a digital video signal S302, and outputs the digital video signal S302 to a low-pass filter (LPF) 303 and a sync separation circuit 304.

The LPF 303 subjects the inputted digital video signal S302 to noise elimination, and outputs an obtained signal to a slice level calculation circuit 305, a clock run-in (CRI) detection circuit 306, a text broadcast system detection circuit 307, and a binarization circuit 308.

The sync separation circuit 304 separates a horizontal synchronizing signal S304a and a vertical synchronizing signal S304b from the inputted digital video signal S302, and outputs the separated signals S304a and S304b to the CRI detection circuit 306. Here, the horizontal synchronizing signal S304a and the vertical synchronizing signal S304b are employed to detect positions of a CRI period and the like.

The slice level calculation circuit 305 calculates an optimum slice level S305 for text broadcast data in a predetermined line and a predetermined position of the digital video signal S303 that has been subjected to the noise elimination, and outputs the calculated slice level S305 to the binarization circuit 308.

The CRI detection circuit 306 detects the position of a CRI period in the digital video signal S303 that has been subjected to the noise elimination, using the horizontal synchronizing signal S304a and the vertical synchronizing signal S304b, and outputs a CRI detection signal S306 to the text broadcast system detection circuit 307, a counter 310, and an extraction pulse generation circuit 314.

The text broadcast system detection circuit 307 calculates the CRI cycle of the digital video signal S303 that has been subjected to the noise elimination, in accordance with the CRI detection signal S306, then determines the type of the text broadcast system on the basis of the calculated cycle, and outputs a text broadcast system pulse S307 to the extraction interval calculation circuit 309.

The binarization circuit 308 converts the digital video signal S303 that has been subjected to the noise elimination, into a binary signal S308 being composed of 0 and 1, based on the slice level S305 calculated by the slice level calculation circuit 305, and outputs the binary signal S308 to an extraction circuit 316 and a zero-crossing point detection circuit 315.

The extraction interval calculation circuit 309 calculates an optimum extraction interval data S309 in accordance with the text broadcast system pulse S307, and outputs the calculated extraction interval data S309 to an arithmetic unit 312. Here, the extraction interval data S309 can be calculated from a ratio between the sampling clock fs and a transmission clock of various text broadcast systems. In other word, when the type of the text broadcast system and the frequency of the sampling clock are obtained, the extraction interval data S309 can be calculated. A unit of the extraction interval data S309 is the number of the sampling clocks.

The counter 310 is initiated in accordance with an input of the CRI detection signal S306 and reset in accordance with an input of the extraction pulse S314 generated by the extraction pulse generation circuit 314, and it outputs counter data S310 to a counter value capture circuit 311 and a comparator 313.

The counter value capture circuit 311 captures the counter data S310 in response to detection of a zero-crossing point pulse S315, and outputs counter load data S311 to the arithmetic unit 312.

The arithmetic unit 312 adds one-half the extraction interval data S309 to the counter load data S311, and outputs calculated data S312 to the comparator 313. Here, in the case of a normal signal including no phase delay or phase lead, the counter load data S311 coincides with one-half the extraction interval data S308, and accordingly the calculated data S312 has the same value as the extraction interval data S308. On the other hand, when phase delay occurs, the counter load data S311 is larger than one-half the extraction interval data S309, and thus the calculated data S312 has a value that is larger than the extraction interval data S309. When phase lead occurs, the counter load data S311 is smaller than one-half the extraction interval data S309, and thus the calculated data S312 has a value that is smaller than the extraction interval data S309.

The comparator 313 compares the counter data S310 and the calculated data S312 with each other, and outputs a comparison pulse S313 to the extraction pulse generation circuit 314 when the both data have the same value.

The extraction pulse generation circuit 314 generates an extraction pulse S314 at an optimum position in accordance with the comparison pulse S313, and outputs the generated extraction pulse S314 to the extraction circuit 316.

The zero-crossing point detection circuit 315 detects a zero-crossing point at which the binary signal S308 changes from 0 to 1 or from 1 to 0, and outputs a zero-crossing pulse S315 to the counter value capture circuit 311 and the extraction pulse generation circuit 314.

The extraction circuit 316 extracts text broadcast data S316 from the binary signal S308 in accordance with the extraction pulse S314, and outputs the extracted data S316 to a decoding circuit 317.

The decoding circuit 317 converts the serial text broadcast data S316 extracted by the extraction circuit 316 into parallel data, then performs a decoding process depending on the type of the text broadcast such as error correction, and outputs decoded data S316 to outside through an output terminal 318.

The operation of the data signal extraction apparatus according to the second embodiment, which is constructed as described above, will be described with reference to FIG. 4. It is assumed here that the type of the text broadcast data is teletext broadcast.

Figure 4:
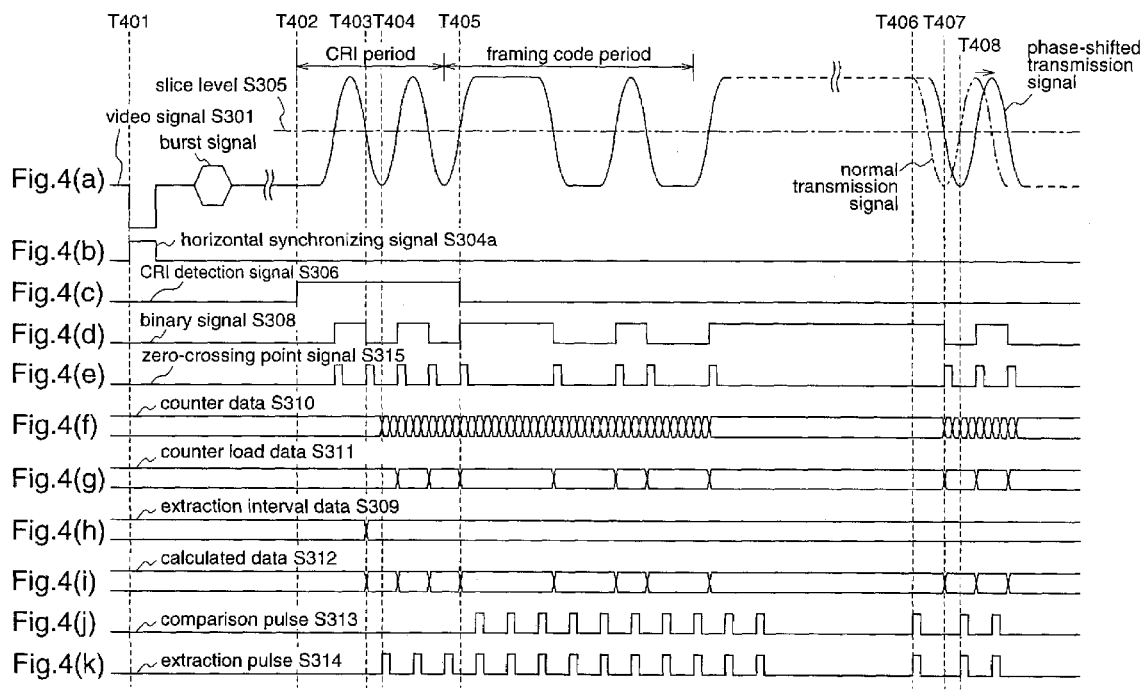
FIGS. 4(a) to 4(k) are timing charts for explaining an operation of the data signal extraction apparatus according to the second embodiment.

FIG. 4 are timing charts for explaining the operation of the data signal extraction apparatus according to the second embodiment. FIG. 4(a) shows an analog video signal S310, FIG. 4(b) shows a horizontal synchronizing signal S304a, FIG. 4(c) shows a CRI detection signal S306, FIG. 4(d) shows a binary signal S308, FIG. 4(e) shows a zero-crossing point pulse S315, FIG. 4(f) shows counter data S310, FIG. 4(g) shows counter load data S311, FIG. 4(h) shows extraction interval data S309, FIG. 4(i) shows calculated data S312, and FIG. 4(j) shows extraction pulse S314.

An analog video signal S310 inputted through the video signal input terminal 310 includes, as shown in FIG. 4(a), a horizontal synchronizing signal, a burst signal, a CRI period, a framing code period indicating the type of text broadcast and the like, and text broadcast data.

At time T401, a horizontal synchronizing signal S304a as shown in FIG. 4(b) is separated by the sync separation circuit 304 from a digital video signal S302 that is obtained by digitizing the analog video signal S301 in the A/D converter 302.

At time T402, a CRI period is detected by the CRI detection circuit 306 from a signal S303 that is obtained by performing noise elimination to the digital video signal S302 by means of the LPF 303, thereby to generate a CRI detection signal S306 as shown in FIG. 4(c). In addition, the signal S302 that is obtained by the noise elimination is binarized by the binarization circuit 308 based on the slice level S305 calculated by the slice level calculation circuit 305, to generate a binary signal S308 as shown in FIG. 4(d), which has a value of 1 when the signal S302 is larger than the slice level S305 while having a value of 0 when the signal S302 is smaller than the slice level S305. Then, a pulse of a zero-crossing point at which the binary signal S308 changes from 0 to 1 or from 1 to 0 is detected by the zero-crossing point detection circuit 312, thereby generating a zero-crossing point pulse S315 as shown in FIG. 4(e).

At time T403, the number of clocks between adjacent zero-crossing pulses S315, i.e., the cycle is calculated during a period in which the CRI detection signal S306 has a value of 1, and when the cycle matches, for example, the text broadcast system of the teletext broadcast, the extraction interval calculation circuit 309 generates extraction interval data S309 as shown in FIG. 4(h).

At time T404, the extraction pulse generation circuit 314 generates an extraction pulse S314 as shown in FIG. 4(k) at a position corresponding to one-half the extraction interval data starting from the zero-crossing point pulse S315. When the first extraction pulse S314 is generated, the counter 310 is reset in accordance with the next extraction pulse S314 while simultaneously initiating its operation to generate counter data S310 as shown in FIG. 4(f). The counter value capture circuit 311 loads the counter data S310 shown in FIG. 4(f) in accordance with the zero-crossing point pulse S315 as shown in FIG. 4(e), which is generated by the zero-crossing point detection circuit 315, thereby generating counter load data as shown in FIG. 4(g). The arithmetic unit 312 adds the counter load data S311 and a value corresponding to one-half the extraction interval data S309, and outputs the result of the addition as calculated data S312 as shown in FIG. 4(i). The comparator 313 compares the counter data S310 and the calculated data S312, and generates a comparison pulse S313 shown in FIG. 4(j) at a position where the both data have the same value. The extraction pulse generation circuit 314 generates an extraction pulse S314 at a position corresponding to one-half the extraction interval data starting from the zero-crossing point pulse S315 during a period from time T404 to time T405, in which the CRI detection signal S306 is 1 and the zero-crossing point signal S315 is detected, as well as the extraction interval data S309 is determined. After time T405, the comparison pulse S313 is employed as the extraction pulse.

From time T405 to time T406, as waveform distortion such as phase delay resulting from group delay or the like does not occur in the analog video signal S301 including text broadcast data which are superimposed thereon, the counter load data S311 and one-half the extraction interval data S309 have the same value, and accordingly the calculated data S312 is identical to the extraction interval data S309. Therefore, the comparison pulse S313 and the extraction pulse S314 are generated at intervals corresponding to the extraction interval data S309.

When phase delay resulting from group delay or the like occurs at time T406, the counter load data S311 does not have the same value as one-half the extraction interval data S309 at time T407. The arithmetic unit 312 adds the counter load data S311 and one-half the extraction interval data to obtain the calculated data S312.

When it is assumed here that the value of one-half the extraction interval data S309 is øn, the value of the counter load data S311 is CNTLD, and the value of the calculated data S312 is CALD, the calculated data S312 CALD is expressed by (øn+CNTLD). In the case of phase delay, the calculated data S312 CALD is larger than the value of the extraction interval data S309, i.e., 2øn. In the case of phase lead, the calculated data CALD S312 is smaller than the value of the extraction interval data S309, 2øn. In the case of the phase delay as shown in FIG. 4, the calculated data S312 is larger than the extraction interval data S309, and the comparison pulse S313 generated at time T407 has a time interval which is larger than that of the comparison pulse S313 generated from time T405 to time T406. The same thing can be said for the extraction pulse S314. Thus, even when the inputted video signal is delayed in phase, the extraction pulse is corrected according to the phase delay, to correct the amount of the phase delay at time T407, whereby the text broadcast data S316 can be properly extracted from the inputted video signal without an extraction error occurring in the extraction circuit 316.

Then, the extracted text broadcast data S316 is decoded by the decoding circuit 317, and outputted to a display circuit (not shown). Thus, the display according to the type of the text broadcast can be realized.

The description has been given of the phase delay with reference to FIG. 4 while, in the case of phase lead, the calculated data S312 is smaller than the extraction interval data S309, and when the amount of the phase lead is corrected, the text broadcast data can be properly extracted from the inputted video signal.

Further, also in cases where the text broadcast signal is not a teletext signal, the correct extraction can be realized in the same manner as described above, i.e., by determining the type of the text broadcast, then calculating the extraction interval data S309 depending on the type, and correcting the extraction pulse adaptively when phase lead occurs.

According to the data signal extraction apparatus of the second embodiment, the counter 310 counts the number of sampling clocks corresponding to phase shift in the inputted video signal S301 that is serially transmitted from outside, the count value of the counter 310 is captured in response to detection of the zero-crossing point S315 by the zero-crossing point detection circuit 315, the phase shift amount S313 in the signal is calculated using the count value S311 and the extraction interval value S309 calculated by the extraction interval calculation circuit 309, the extraction interval value S309 is corrected according to the calculated phase shift amount S311, thereby generating the extraction pulse S314. Therefore, the phase shift in the inputted video signal can be detected instantaneously, and the extraction pulse can be generated at an optimum position. Consequently, correct extraction can be performed for a signal including distortion in the transmission system due to group delay or the like with a simple circuit construction, without the need of a large-scaled circuit such as a waveform equalizer.

In addition, this data signal extraction apparatus determines the type of the text broadcast system, and generates the extraction pulse on the basis of the determined type and the frequency of the sampling clock. Therefore, not only European teletext broadcast but also VPS, WSS, Japanese text-multiplexed broadcast, Electric Program Guide (abbreviated as EPG), US closed caption broadcast can be adaptively extracted. Accordingly, this data signal extraction apparatus according to the second embodiment can handle global text broadcast systems.

Embodiment 3

A data signal extraction apparatus according to a third embodiment of the present invention will be described with reference to FIGS. 5 to 8.

Figure 5:
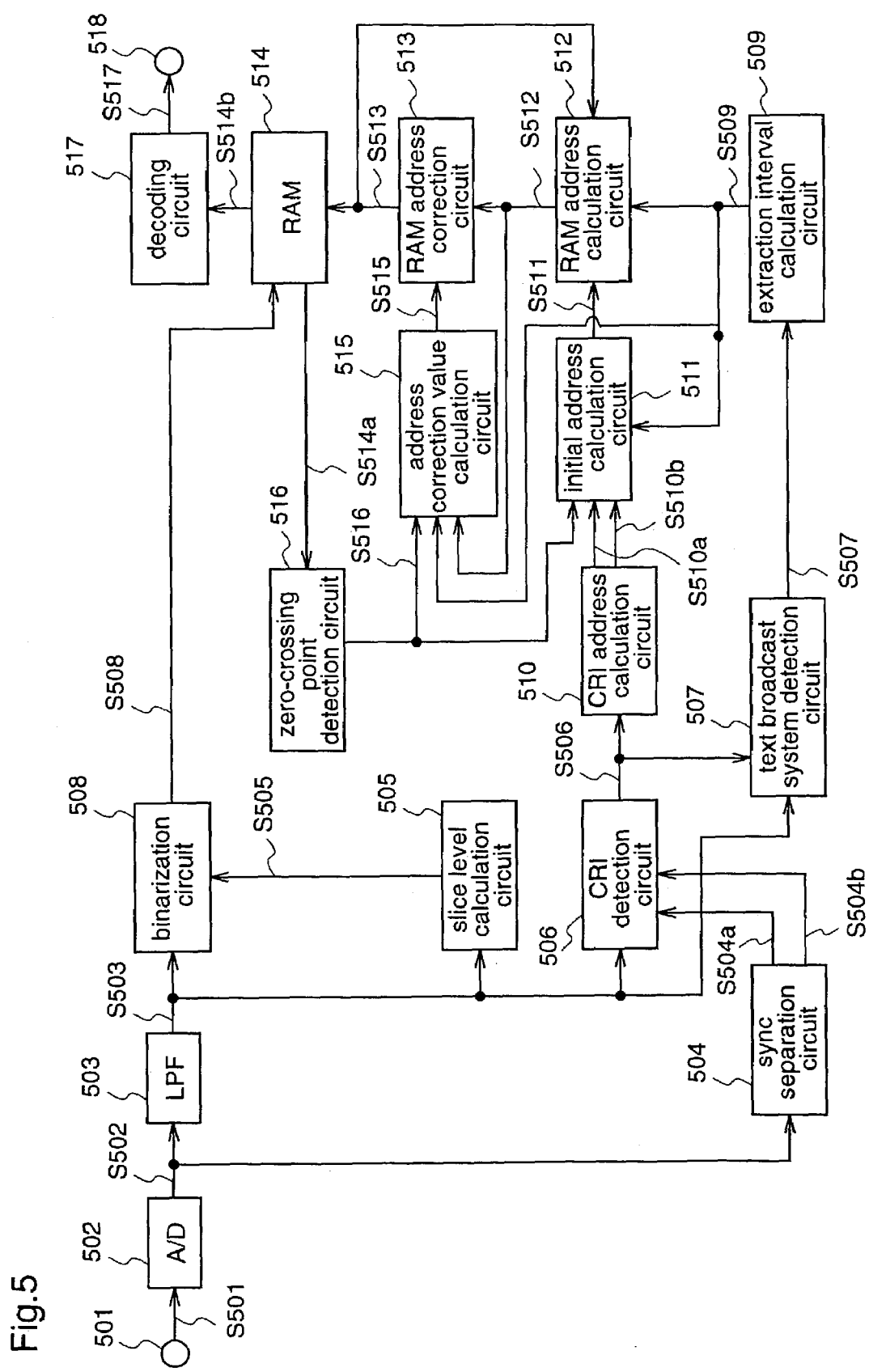
FIG. 5 is a block diagram illustrating a construction of a data signal extraction apparatus according to a third embodiment of the present invention.

FIG. 5 is a block diagram illustrating a construction of the data signal extraction apparatus according to the third embodiment.

In FIG. 5, an analog video signal S501 including text broadcast data which are superimposed upon a vertical blanking interval is inputted through a video signal input terminal 501.

An A/D converter 502 samples the analog video signal S501 based on a predetermined sampling clock fs (MHz) to convert the signal into a digital video signal S502, and outputs the digital video signal S502 to a low-pass filter (LPF) 503 and a sync separation circuit 504.

The LPF 503 subjects the inputted digital video signal S502 to noise elimination, and outputs an obtained signal to a slice level calculation circuit 505, a clock run-in (CRI) detection circuit 506, a text broadcast detection circuit 507, and a binarization circuit 508.

The sync separation circuit 504 separates a horizontal synchronizing signal S504a and a vertical synchronizing signal S504b from the inputted digital video signal S502, and outputs the separated signals S504a and S504b to the CRI detection circuit 506. The horizontal synchronizing signal S504a and the vertical synchronizing signal S504b are employed to obtain positions of the CRI period and the like.

The slice level calculation circuit 505 calculates an optimum slice level S505 on the basis of text broadcast data in a predetermined line and a predetermined position in the digital video signal S503 that has been subjected to the noise elimination, and outputs the calculated slice level S505 to the binarization circuit 508.

The CRI detection circuit 506 detects the position of a CRI period in the digital video signal S503 that has been subjected to the noise elimination, using the horizontal synchronizing signal S504a and the vertical synchronizing signal S504b, and outputs a CRI detection signal S506 to the text broadcast system detection circuit 507 and a CRI address calculation circuit 510.

The text broadcast system detection circuit 507 calculates a CRI cycle of the digital video signal S503 that has been subjected to the noise elimination, in accordance with the CRI detection signal S506, and determines the type of the text broadcast system on the basis of the calculated cycle, to output a text broadcast system pulse S507 to an extraction interval calculation circuit 509.

The binarization circuit 508 converts the digital video signal S503 that has been subjected to the noise elimination, based on the slice level S505 that has been calculated by the slice level calculation circuit 505, into a binary signal S508 being composed of 0 and 1, and outputs the binary signal S508 to a RAM 514.

The extraction interval calculation circuit 509 calculates optimum extraction interval data S509 in accordance with the text broadcast system pulse S507, and outputs the calculated data S509 to an initial address calculation circuit 511, a RAM address calculation circuit 512, and an address correction value calculation circuit 515. Here, the extraction interval data S509 can be calculated from a ratio between the sampling clock fs and a transmission clock of various broadcast systems. In other words, when the type of the text broadcast system and the frequency of the sampling clock are obtained, the extraction interval data S509 can be calculated. A unit of the extraction interval data S509 is the number of the sampling clocks.

The CRI address calculation circuit 510 calculates a CRI start address (CRISA) S510a indicating a CRI start position and a CRI end address (CRIEA) S510b indicating a CRI end position, on the basis of the CRI detection signal S506, and outputs the calculated addresses S510a and S510b to the initial address calculation circuit 511.

The initial address calculation circuit 511 detects a zero-crossing point address between the CRI start address S510a and the CRI end address S510b, among inputted zero-crossing point addresses S516, then adds a value of one-half the extraction interval data S509 to the detected zero-crossing point address to obtain an initial address S511, and outputs the initial address S511 to the RAM address calculation circuit 512.

The RMA address calculation circuit 512 adds the extraction interval data S509 successively to the initial address S511 (starting point address) to obtain an RAM address S512, and outputs the obtained RAM address S512 to a RAM address correction circuit 513 and the address correction value calculation circuit 515, while when receiving the RAM corrected address S513 that is outputted from the RAM address correction circuit 513, adding the extraction interval data S509 successively to the RAM corrected address S513 to obtain the RAM address S512, and outputs the RAM address S512 to the RAM address correction circuit 513 and the address correction value calculation circuit 515.

The RAM address correction circuit 513 adds address correction data S515 to the RAM address S512 to calculate the RAM corrected address S513, and outputs the corrected address S513 to the RAM 514 and the RAM address calculation circuit 512.

The RAM 514 stores data corresponding to one line of the binary signal S508, and outputs the stored data S514a to the zero-crossing point address detection circuit 516. Further, when the RAM corrected address S513 is inputted, the RAM 514 outputs serial data S514b corresponding to the RAM corrected address S513 to the decoding circuit 517.

The address correction value calculation circuit 515 subtracts one-half the extraction interval data S509 from a value that is obtained by subtracting the RAM address S512 from the zero-crossing point address S516, and outputs the obtained value to the RAM address correction circuit 513 as the address correction data S515. In the case of a normal signal including no phase delay or phase lead, the value that is obtained by subtracting the RAM address S512 from the zero-crossing point address S516 coincides with one-half the extraction interval data S509, whereby the address correction data S515 has a value of 0. However, when the phase delay occurs, the value that is obtained by subtracting the RAM address S512 from the zero-crossing point address S516 is larger than one-half the extraction interval data S509. On the other hand, when the phase lead occurs, this value is smaller than one-half the extraction interval data S509. In other words, the address correction data S515 has a positive number when the phase delay occurs, while the data S515 has a negative number when the phase lead occurs.

The zero-crossing point address detection circuit 516 detects the zero-crossing point address S516 at which the binary signal changes from 0 to 1 or from 1 to 0, from the data S514a stored in the RAM 514, and outputs the detected address to the initial address calculation circuit 511 and the address correction value calculation circuit 515.

The decoding circuit 517 converts the serial text broadcast data S514b that is outputted from the RAM 514 into parallel data, then performs a decoding process such as error correction, depending on the type of the text broadcast, and outputs decoded data S517 to outside through an output terminal 518.

The operation of the data signal extraction apparatus according to the third embodiment, which is constructed as described above, will be described with reference to FIG. 6. It is assumed here that the type of the text broadcast data is teletext broadcast.

When an analog video signal including teletext broadcast text data which are superimposed thereon (text broadcast signal) S501 is inputted through the video signal input terminal 501, the text broadcast signal S501 is digitized into a digital video signal S502 by the A/D converter 502 (step S601).

Then, a horizontal synchronizing signal S504a and a vertical synchronizing signal S504b are separated from the digital video signal S502 by the sync separation circuit 504 (step S602). In addition, the digital video signal S502 is subjected to noise elimination by the LPF 503 (step S603). Then, a slice level value for the digital video signal S503 is calculated by the slice level calculation circuit 505 (step S604), the digital video signal S503 that has been subjected to the noise elimination is converted into a binary signal being composed of 0 and 1, by the binarization circuit 508, using the calculated slice level value (step S605), and the obtained binary signal is stored in the RAM 514.

Then, the CRI period of the text broadcast signal S501 is detected by the CRI detection circuit 506, from the digital video signal S503 that has been subjected to the noise elimination (step S607), and the CRI start address CRISA S510a indicating the start position of the CRI period and the CRI end address CRIEA S510b indicating the end position of the CRI period are detected and set by the CRI address calculation circuit 510 (steps S608 and S609). Then, the text broadcast system detection circuit 507 calculates the frequency of the CRI in the CRI period detected by the CRI detection circuit 506, to detect the type of the text broadcast system (step S610).

The extraction interval calculation circuit 509 calculates an extraction interval SPINTV depending on the type of the text broadcast system (step S611), and performs an extraction process for text broadcast data on the basis of the extraction interval SPINTV (step S612). The extracted serial text broadcast data S514b is converted into parallel data by the decoding circuit 517, then subjected to a decoding process such as error correction depending on the type of the text broadcast, and decoded data are outputted to a display circuit (not shown) through the output terminal 518 (step S613). Accordingly, the display depending on the type of the text broadcast can be realized.

Next, the data extraction process of step S612 in FIG. 6 will be described in more detail with reference to FIG. 7.

The i-th extraction pulse ("i" is an integer that is equal to or larger than zero) of the text broadcast signal is subjected to the data extraction process as shown below, successively in the order of the extraction (step S701).

Initially, the zero-crossing point address ZRCRSA(i) at which the binary signal changes from 0 to 1 or from 1 to 0 is calculated (step S702).

Figure 6:
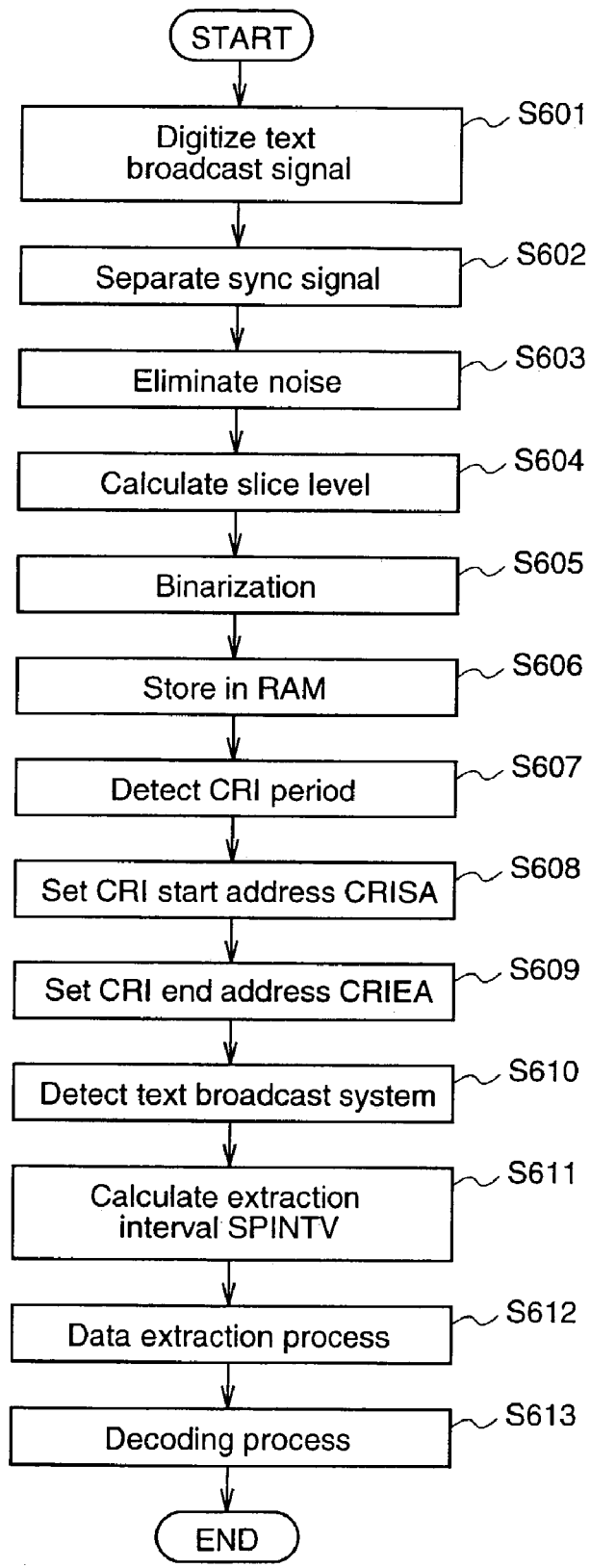
FIG. 6 is a flowchart for explaining principal steps in an operation of the data signal extraction apparatus according to the third embodiment.
Figure 7:
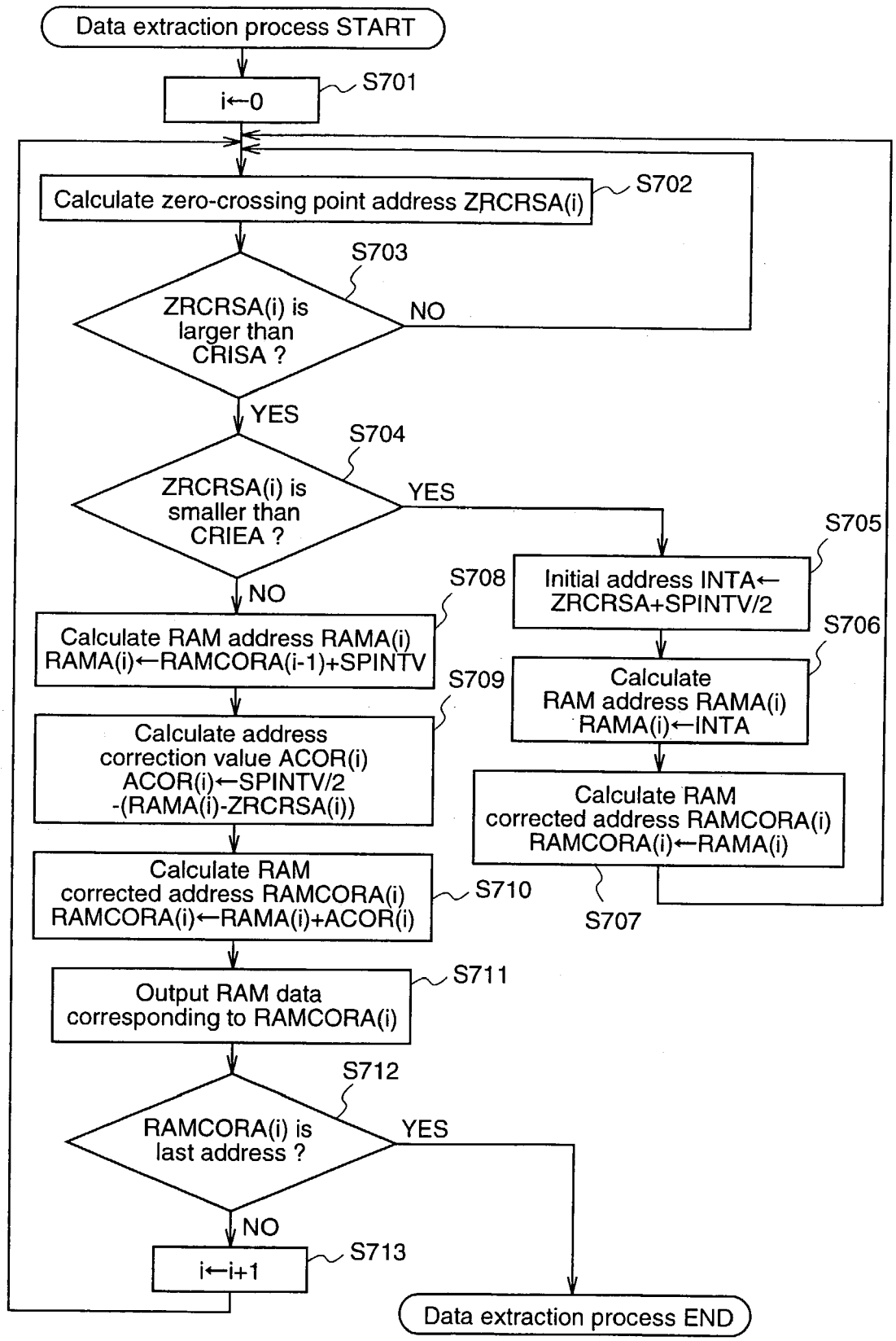
FIG. 7 is a flowchart for explaining an extraction step in the operation of the data signal extraction apparatus according to the third embodiment.

Then, the zero-crossing point address ZRCRSA(i) and the CRI start address CRISA obtained in step S608 of FIG. 6 are compared with each other (step S703). As a result of the comparison, when the zero-crossing point address ZRCRSA(i) is larger than CRISA, the operation proceeds to the next step S704. When the zero-crossing point address ZRCRSA(i) is smaller than CRISA, the operation returns to step S702 to perform again the calculation of the zero-crossing point address ZRCRSA(i).

Next, the zero-crossing address ZRCRSA(i) and the CRI end address CRIEA obtained in step S609 of FIG. 6 are compared with each other (step S704). As a result of the comparison, when the zero-crossing point address ZRCRSA(i) is smaller than CRIEA, the operation proceeds to step S705, while when the zero-crossing point address ZRCRSA(i) is larger than CRIEA, the operation proceeds to step S708.

The above-mentioned processes in steps S703 and S704 are carried out to check whether the zero-crossing point address ZRCRSA(i) is within the CRI period or not.

When the zero-crossing point address ZRCRSA(i) is within the CRI period, a value of one-half the extraction interval SPINTV calculated in step S611 of FIG. 6 is added to the zero-crossing point address ZRCRSA(i), to calculate an initial address INTA (step S705). Then, the calculated initial address INTA is substituted into an RAM address RAMA(i) (step S706), and the RAM address RAMA(i) is substituted into a RAM corrected address RAMCORA(i) (step S707). Here, during the CRI period, the processes from step S702 to step S707 are successively carried out.

When the CRI period ends, i.e., when the zero-crossing point address ZRCRSA(i) is larger than the CRI end address CRIEA, the extraction interval SPINTV is added to the RAM corrected address RAMCORA(i-1) that was calculated immediately before, to obtain an RAM address RAMA(i) (step S708). Then, a value that is obtained by subtracting the zero-crossing point address ZRCRSA(i) calculated in step S702 from the RAM address RAMA(i) calculated in step S708 is subtracted from one-half the extraction interval SPINTV, to obtain an address correction value ACOR(i) (step S709). Then, the calculated address correction value ACOR(i) is added to the RAM address RAMA(i), to calculate a RAM corrected address RAMCORA(i) (step S710). Data S514b corresponding to the RAM corrected address RAMCORA(i) that is obtained as described above is outputted from the RAM 514 (step S711). Then, it is checked whether this pulse is the last extraction pulse of the text broadcast signal or not (step S712). When it is the last extraction pulse, the data extraction process is finished, and otherwise the operation returns to step S702 to perform the above-mentioned process again for the next pulse (step S713).

Figure 8:
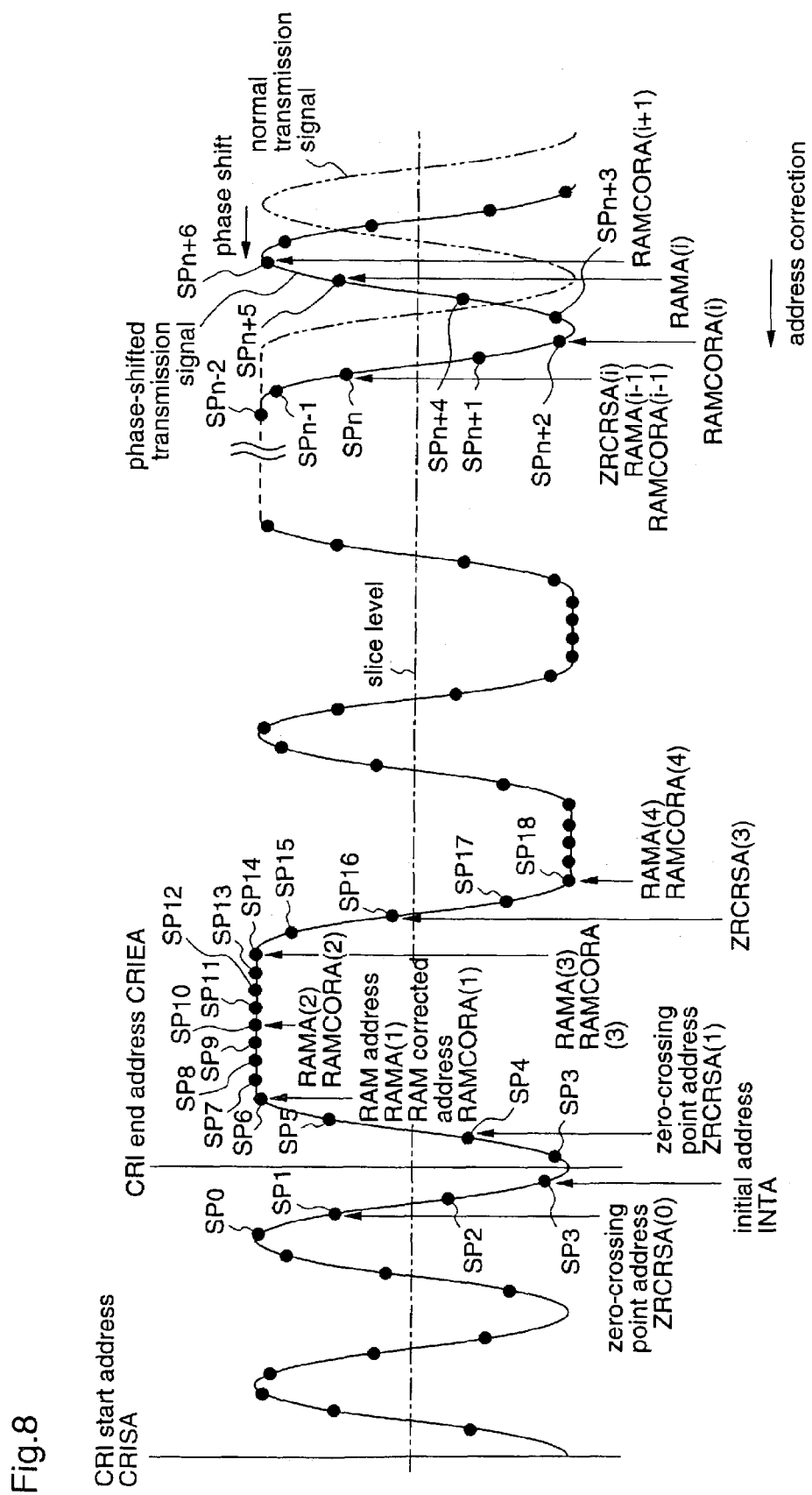
FIG. 8 is a diagram for explaining the operation of the data signal extraction apparatus according to the third embodiment.

Hereinafter, the operation of the data signal extraction apparatus according to the third embodiment will be described more specifically with reference to FIG. 8. It is assumed here that the European teletext signal is employed as a text broadcast signal, and the sampling clock is 28 MHz. In FIG. 8, SP0 to SPn+6 represented by black dots denote points which are obtained by sampling the teletext signal at 28 MHz. Because the transmission clock of the European teletext signal is 6.9375 MHz, the extraction interval has a value that is obtained by dividing the sampling clock 28 MHz by 6.9375 MHz, i.e., 4.036.

Initially, a zero-crossing point address ZRCRSA(0) between the CRI start address CRISA and the CRI end address is detected. It is assumed here that the address ZRCRSA(0) is at a sampling point SP1.

The initial address is at a position that is leaded from the sampling point SP1 by one-half the extraction interval, i.e., 2.018, but there is no sampling point at the position indicated by that address, and therefore the initial address INTA is set at a closest sampling point having a value from which all digits to the right of the decimal point are discarded. In this case, the initial address INTA is set at a sampling point SP3. Here, the initial address INTA corresponds to the RAM address RAMA(0) and the. RAM corrected address RAM-CORA(0).

Subsequently, the extraction interval value 4.036 is added to the RAM corrected address RAMCORA(0), to calculate the next RAM address RAMA(1). Since the value is rounded off to the nearest integer, the RAM address RAMA(1) corresponds to a sampling point SP6.

In this case, as there is a zero-crossing point address ZSCRSA(1) at a sampling point SP4 between the RAM corrected address RAMCORA(0) and the RAM address RAMA(1), the address correction value ACOR(1) is calculated. When assuming that the value of the initial address INTA is 0, the RMA address RAMA(1) is 4 and the zero-crossing point address ZRCRSA(1) is 2. Therefore, a value that is obtained by subtracting the zero-crossing point address ZRCRSA(1) from the RAM address RAMA(1) is 2, and thus the address correction value ACOR(1) can be calculated by subtracting 2 from one half the extraction interval, 2.018, thereby resulting in 0.018.

Further, a value 4.018 that is obtained by adding the RAM address RAMA(1) to the calculated address correction value (1) is the RAM corrected address RAMCORA(1). Here, as the value is rounded off to the nearest integer, the RAM corrected address RAMCORA(1) is positioned at the sampling point SP6, like the RAM address RAMA(1).

In this case, as there is no zero-crossing point address between the RAM corrected address RAMCORA(1) and the next RAM address RAMA(2), the address correction is not required. Therefore, the RAM address RAMA(2) and the RAM corrected address RAMCORA(2) coincide with each other, and accordingly the RAM corrected address RAMCORA(2) is generated at a position of a sampling point SP10.

Hereinafter, in the same way, the address correction is performed when there is a zero-crossing point, while the correction is not performed when there is no zero-crossing point, whereby a RAM corrected address is generated at an optimum position.

In other words, in the case of a normal signal such as a teletext signal of the analog video signal S501 including no phase shift or the like, the RAM address RAMA(i) and the RAM corrected address RAMCORA(i) coincide with each other.

When phase shift, phase lead in this case, occurs in a position of the analog video signal S501 as shown in FIG. 8, an extraction error will occur when the correction of the RAM address is not performed. More specifically, when the RAM address is not corrected, an extraction interval value 4.036 is added to the RAM corrected address RAMCORA (i-1), then the obtained value is rounded off to the nearest integer to obtain the RAM address RAMA(i), and accordingly the RAM address RAMA(i) is generated at a sampling point SPn+5. Consequently, although data "0" must be extracted, "1" is adversely extracted, resulting in an extraction error.

However, when the RAM address is corrected, the address correction value ACOR(i) has a value −2.982 obtained by subtracting a value 5 that is obtained by subtracting the zero-crossing address ZRCRSA(i) from the RAM address RAMA(i), from one-half the extraction interval 2.018. Then, the address correction value ACOR(i) is added to the RAM address RAMA(i) to calculate the RAM corrected address RAMCORA(i). That is, the RAM corrected address RAMCORA(i) is generated at a position of a sampling point SPn+2, which is backward from the RAM address RAMA(i) by −3 that is obtained by rounding −2.982 to the nearest integer. Thus, the RAM address is corrected from the position SPn+5 to a position SPn+2. Accordingly, 0 can be correctly extracted, although 1 is adversely extracted in the case where the correction is not carried out.

Here, the description has been given of the phase lead with reference to FIG. 8 while in the case of phase delay, the address correction value ACOR has a positive number, and text broadcast data can be correctly extracted by correcting the amount of phase delay. Further, when the text broadcast signal is not a teletext signal, the correct extraction can be realized in the same manner as described above, i.e., by determining the type of the text broadcast, then calculating the extraction interval depending on the type, and when phase shift occurs, correcting the RAM address adaptively.

According to the data signal extraction apparatus of the third embodiment, the inputted video signal S501 that has been serially transmitted from outside is digitized, then the digital video signal S502 is converted into the binary signal S508 to be stored in the RAM 514, and then the RAM address S509 corresponding to the text broadcast signal superimposed upon the digital video signal S502 is calculated. When phase shift occurs in the signal, the phase shift is detected instantaneously, then the address correction value S515 is calculated to obtain the RAM address correction value S513, and data corresponding to the RAM address correction value S503 is extracted from the signal S508 stored in the RAM 514. Therefore, when the phase shift occurs in the middle of the inputted video signal, the amount of phase shift is detected instantaneously to obtain an optimum extraction address, and consequently the correct extraction can be performed for a signal including distortion in the transmission system due to group delay or the like with a simple circuit construction, without the need of a large-scaled circuit such as waveform equalizer.

While the text data signal extraction apparatus according to the third embodiment implements the extraction process by hardware, the same process can be implemented by software.

Embodiment 4

A data signal extraction apparatus according to a fourth embodiment of the present invention will be described with reference to FIGS. 9 and 10.

Figure 9:
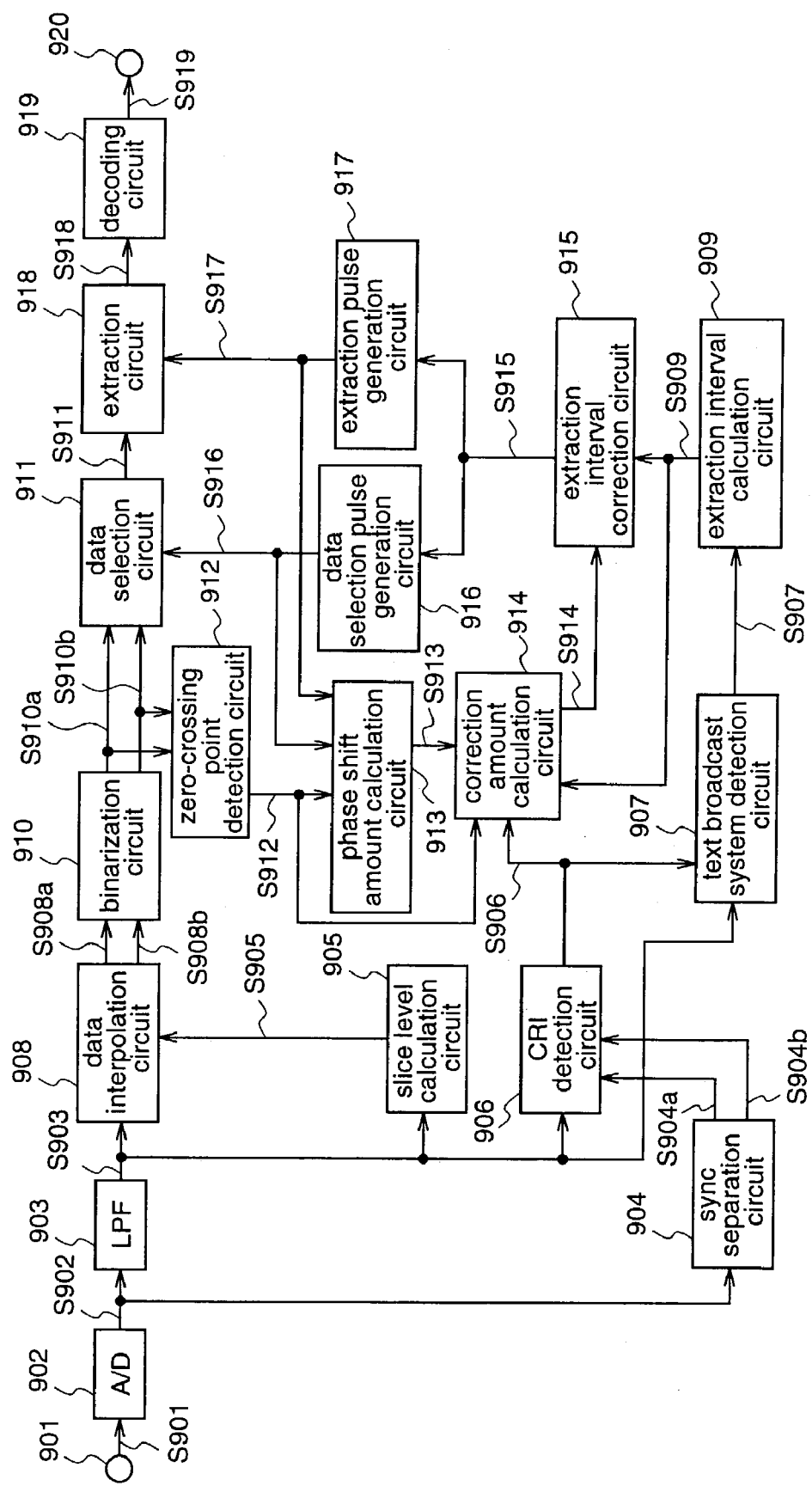
FIG. 9 is a block diagram illustrating a construction of a data signal extraction apparatus according to a fourth embodiment.

FIG. 9 is a block diagram illustrating a construction of the data signal extraction apparatus according to the fourth embodiment.

In FIG. 9, an analog video signal S901 including text broadcast data which are superimposed upon a vertical blanking interval is inputted through a video signal input terminal 901.

An A/D converter 902 samples the analog video signal S901 based on a predetermined sampling clock fs (MHz) to convert the signal S901 into a digital video signal S902, and outputs the digital video signal S902 to a low-pass filter (LPF) 903.

The LPF 903 subjects the inputted digital video signal S902 to noise elimination, and outputs the obtained signal to a slice level calculation circuit 905, a clock run-in (CRI) detection circuit 906, and a text broadcast system detection circuit 907.

A sync separation circuit 904 separates a horizontal synchronizing signal S904a and a vertical synchronizing signal S904b from the inputted digital video signal S902, and outputs the separated signals S904a and S904b to the CRI detection circuit 906. Here, the horizontal synchronizing signal S904a and the vertical synchronizing signal S904b are employed to detect positions of a CRI period and the like.

The slice level calculation circuit 905 calculates an optimum slice level S905 for text broadcast data in a predetermined line and a predetermined position in the digital video signal S903 that has been subjected to the noise elimination, and outputs the calculated slice level S905 to a data interpolation circuit 908.

The CRI detection circuit 906 detects the position of the CRI period in the digital video signal S903 that has been subjected to the noise elimination, using the horizontal synchronizing signal S904a and the vertical synchronizing signal S904b, and outputs a CRI detection signal S906 to the text broadcast system detection circuit 907 and a correction amount calculation circuit 914.

The text broadcast system detection circuit 907 calculates the CRI cycle of the digital video signal S903 that has been subjected to the noise elimination, in accordance with the CRI detection signal S906, then determines the type of the text broadcast system on the basis of the calculated cycle, and outputs a text broadcast system pulse S907 to an extraction interval calculation circuit 909.

The data interpolation circuit 908 generates an original signal S908a and an interpolation signal S908b for interpolating the original signal so as to have data α times (α is an integer, which is hereinafter employed as an interpolation factor) as much as the original signal, from the digital video signal S903 that has been subjected to the noise elimination, and outputs the generated signals S908a and S908b to a binarization circuit 910.

The extraction interval calculation circuit 909 calculates an optimum extraction interval data S909 on the basis of the text broadcast system pulse S907, and outputs the calculated data S909 to the correction amount calculation circuit 914 and an extraction interval correction circuit 915. Here, the extraction interval data S909 can be calculated from a ratio between the sampling clock fs and a transmission clock of various text broadcast systems. When assuming that the transmission clock of the text broadcast is fchr and the interpolation factor is α, the extraction interval data S909 is obtained by α×fs/fchr. When fs is an integral multiple of fchr, the extraction interval data S909 is an integer. However, since in this embodiment there is no need that fs is an integral multiple of fchr, the extraction interval data S909 includes a decimal fraction.

The binarization circuit 910 converts the original signal S908a and the interpolation signal S908b which have been generated by the data interpolation circuit 908, into a binary original signal S910a and a binary interpolation signal S910b which are composed of 0 and 1, based on the slice level S905 that has been calculated by the slice level calculation circuit 905, respectively, and outputs the signals S910a and S910b to a data selection circuit 911 and a zero-crossing point detection circuit 912.

The data selection circuit 911 selects one of the binary original signal S910a and the binary interpolation signal S910b in accordance with a data selection pulse S916, and outputs the selected signal to an extraction circuit 918.

The zero-crossing point detection circuit 912 detects a zero-crossing point at which the binary original signal S910a and the binary interpolation signal S910b changes from 0 to 1 or from 1 to 0, and outputs zero-crossing point data S912 to a phase shift amount calculation circuit 913 and the correction amount calculation circuit 914.

The phase shift amount calculation circuit 913 calculates the phase shift amount S913 between the zero-crossing point data S912 and the extraction pulse S917 using the zero-crossing point data S912, the extraction pulse S917, and the data selection pulse S916, and outputs the calculated phase shift amount S913 to the correction amount calculation circuit 914.

The correction amount calculation circuit 914 corrects the extraction interval data S909 according to the phase shift amount data S913, and outputs the corrected extraction interval data as correction amount data S914 to the extraction interval correction circuit 915.

Here, the correction amount data S914 that is calculated on the basis of the phase shift amount data S913 is calculated in following steps.

In the case of a normal signal including no phase delay or phase lead, the difference in phase between the zero-crossing point data S912 and the extraction pulse S917, i.e., phase shift amount data S913 should be one-half the extraction interval data S909.

When phase delay occurs in the signal, the phase shift amount data S913 is larger than one-half the extraction interval data S909, while when phase lead occurs in the signal, the phase shift amount data S913 is smaller than one-half the extraction interval data S909. Therefore, the correction amount calculation circuit 914 calculates the correction amount data S914 by subtracting the phase shift amount data S913 from one-half the extraction interval data S909. Thus, the phase is delayed when the correction amount data S914 has a positive number, while the phase is leaded when the correction amount data has a negative number.

The extraction interval correction circuit 915 corrects the extraction interval data S909 on the basis of the correction amount data S914, and outputs corrected extraction interval data S915 to a data selection pulse generation circuit 916 and an extraction pulse generation circuit 917. As the extraction interval data S909 includes a decimal fraction, the corrected extraction interval data also includes a decimal fraction.

The data selection pulse generation circuit 916 generates the data selection pulse S916 for deciding whether the binary original signal S910a or the binary interpolation signal S910b is to be selected, on the basis of the decimal value of the corrected extraction interval data S915, and outputs the generated pulse to the data selection circuit 911 and the phase shift amount calculation circuit 913.

The extraction pulse generation circuit 917 generates an extraction pulse S917 at an optimum position, on the basis of the value of the integral part of the corrected extraction interval data S915, and outputs the generated pulse to the phase shift amount calculation circuit 913 and the extraction circuit 918.

The extraction circuit 918 extracts text broadcast data S918 from the binary signal S911 that has been selected by the data selection circuit 911 on the basis of the extraction pulse S917, and outputs the extracted data to the decoding circuit 919.

The decoding circuit 919 converts the serial text broadcast data S918 that has been extracted by the extraction circuit 918 into parallel data, then performs a decoding process such as error correction depending on the type of the text broadcast, and outputs decoded data S919 through an output terminal 920.

The operation of the data signal extraction apparatus according to the fourth embodiment, which is constructed as described above, will be described with reference to FIG. 10. Here, the description is given of a case where the type of the text broadcast data is teletext broadcast, the sampling clock fs is 35 MHz, and the interpolation factor α is 2.

Figure 10:
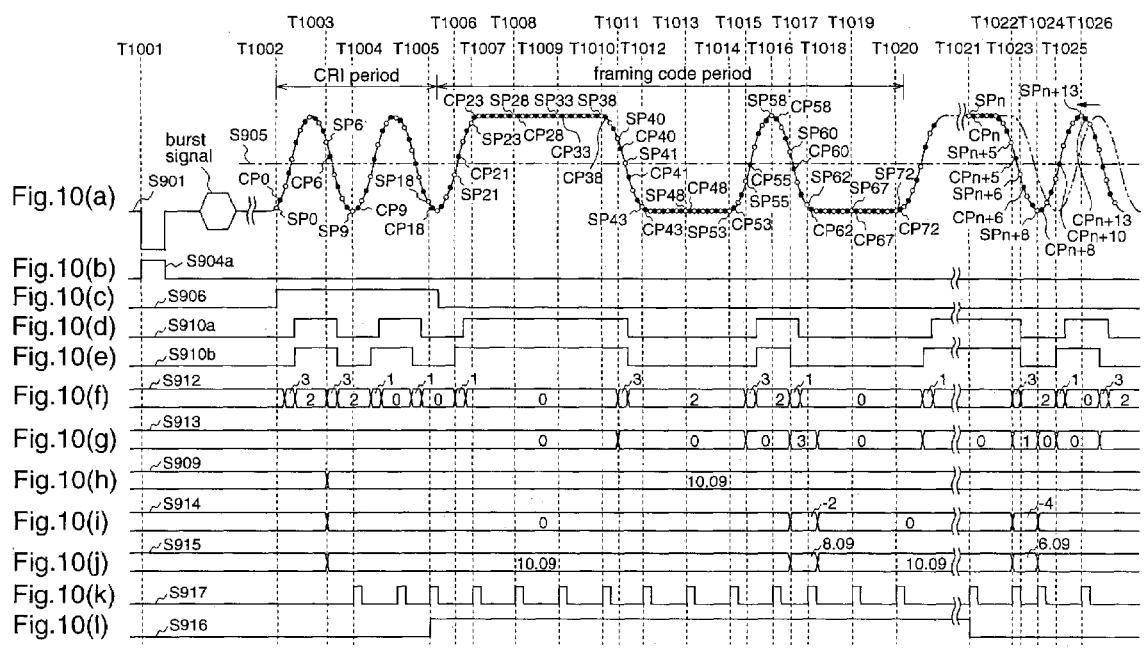
FIGS. 10(a) to 10(l) are timing charts for explaining an operation of the data signal extraction apparatus according to the fourth embodiment.

FIG. 10 are timing charts for explaining the operation of the data signal extraction apparatus according to the fourth embodiment. In the timing charts, FIG. 10(a) shows an analog video signal S910, FIG. 10(b) shows a horizontal synchronizing signal S904a, FIG. 10(c) shows a CRI detection signal S906, FIG. 10(d) shows a binary original signal S910a, FIG. 10(e) shows a binary interpolation signal S910b, FIG. 10(f) shows zero-crossing point data S912, FIG. 10(g) shows phase shift amount data S913, FIG. 10(h) shows extraction interval data S909, FIG. 10(i) shows correction amount data S914, FIG. 10(j) shows corrected extraction interval data S915, FIG. 10(k) shows an extraction pulse S917, and FIG. 10(l) shows a data selection pulse.

An analog video signal S910 inputted through the video signal input terminal 901 includes, as shown in FIG. 10(a), a horizontal synchronizing signal, a burst signal, a CRI period, a framing code period indicating the type of text broadcast and the like, and text broadcast data. Here, a white dot represents an original signal that is obtained by digitizing the analog video signal S901 in the A/D converter 902, and a black dot represents an interpolation signal that is generated by the data interpolation circuit 908. An original signal SP0 and an interpolation signal CP0 shown in FIG. 10(a) are generated at the same time.

At time T1001, a horizontal synchronizing signal S904a as shown in FIG. 10(b) is separated by the sync separation circuit 904, from a digital video signal S902 that is obtained by digitizing the analog video signal S901 in the A/D converter 902.

At time T1002, a CRI period is detected by the CRI detection circuit 906, from a signal S903 that is obtained by subjecting the digital video signal S902 to noise elimination in the LPF 903, thereby generating a CRI detection signal S906 as shown in FIG. 10(c). Further, the original signal S908a represented by the white dots in FIG. 10(a) and the interpolation signal S908b represented by the black dots in FIG. 10(a) which is obtained by linearly interpolating the original signal S908b to obtain doubled data are generated by the data interpolation circuit 908 from the signal S903 that has been obtained by the noise elimination. The generated original signal S908a and interpolation signal S908b are binarized by the binarization circuit 910 based on the slice level S905 calculated by the slice level calculation circuit 905, thereby generating a binary original signal S910a as shown in FIG. 10(c) and a binary interpolation signal S910b as shown in FIG. 10(d), respectively. Then, zero-crossing points at which the binary original signal S910a and the binary interpolation signal S910b change from 0 to 1 or from 1 to 0 are detected by the zero-crossing point detection circuit 912, thereby generating zero-crossing point data S912 as shown in FIG. 10(e). Here, the zero-crossing point data S912 has a value of 0 or 2 when there is no zero-crossing point, 1 when the binary original signal S910a includes a zero-crossing point, and 3 when the binary interpolation signal S910b includes a zero-crossing point.

At time T1003, the number of clocks from a position where the LSB (Least Significant bit) of the zero-crossing point data S912 has a value of 1 to a position where the LSB of the next zero-crossing point data S912 has a value of 1 during a period in which the CRI detection signal S906 is 1, i.e., the cycle is calculated. When the calculated cycle matches any text broadcast system, in this case when the cycle matches the teletext broadcast, the extraction interval calculation circuit 909 generates extraction interval data S909 as shown in FIG. 10(h). Since it is assumed here that the sampling clock is 35 MHz and the interpolation factor is 2, the extraction interval data S909 has a value of 10.09.

At time T1004, the extraction pulse generation circuit 917 and the data selection pulse generation circuit 916 generate an extraction pulse S917 as shown in FIG. 10(k) and a data selection pulse S916 as shown in FIG. 10(l) at a point corresponding to one-half the extraction interval data S909 starting from the zero-crossing point data S912, respectively.

Here, the zero-crossing point data S912 "0" or "2" indicates that there is no zero-crossing point, "1" indicates that the binary original signal S910a includes a zero-crossing point, and "3" indicates that the binary interpolation signal S910b includes a zero-crossing point. Further, the data selection pulse S916 "0" indicates selection of the binary original signal S910a, and "1" indicates selection of the binary interpolation signal S910b.

In addition, as the zero-crossing point data S912 at time T1003 has a value of 3, the binary interpolation signal S910b is employed as a starting point. Further, since one-half the extraction interval data S909 is 5.045, the extraction pulse S917 is generated at a position (time T1004) that is forward by 5 clocks including the original signal and the interpolation signal from the binary interpolation signal S910b at time T1003, which number of clocks is obtained by rounding 5.045 to the nearest integer. In this case, the original signal is selected and thus the data selection pulse S916 has a value of 0. The extraction pulse S917 is generated in the same steps during a period in which the CRI detection signal S906 is 1.

At time T1005, when the CRI detection signal S906 has a value of 0, the extraction pulse S917 and the data selection pulse S916 are generated successively starting from the extraction pulse S917 and the data selection pulse S916 on the basis of the extraction interval data S909.

However, when the zero-crossing point is detected, i.e., when a position at which the zero-crossing point data S912 has a value of 1 or 3 is detected, the extraction interval data S909 will be corrected. In this case, since the data selection pulse S916 is 1, the binary interpolation signal S910b is selected. More specifically, since the data selection pulse S916 is 1 at time T1005, the interpolation signal CP18 shown in FIG. 10(a) is used as a starting point.

Then, the next extraction pulse is generated at a position of the interpolation signal SP23, which is forward from the interpolation signal CP18 by 10 clocks, which number is obtained by rounding off 10.09 (the value of the extraction interval data S909) to the nearest integer.

However, since there is a zero-crossing point at time T1006 between CP18 and CP23, the extraction interval data S909 is to be corrected. The phase shift amount data S913 can be calculated by subtracting one-half the extraction interval data S909 from an interval between the zero-crossing point and the extraction pulse that is positioned before the zero-crossing point. Therefore, the phase shift amount S913 at time T1006 has a value of −0.045, which value is obtained by subtracting one-half the extraction interval data S909 (i.e., 5.045) from the interval value (i.e., 5) between the original signal SP21 that is positioned at a zero-crossing point at time T1006 and the interpolation signal CP18 that is positioned at an extraction point at time T1005. Here, for the purpose of simplicity, it is assumed that a value that is obtained by rounding off the phase shift amount data S913 to the nearest integer is employed. Therefore, the phase shift amount data S913 has a value of 0, i.e., no phase shift occurs, and accordingly, the correction amount data S914 has a value of 0, and the corrected extraction interval data S915 has the same value as the extraction interval data S909, i.e., 10.09, whereby the extraction pulse S917 and the data selection pulse S916 are generated at time T1007.

When the zero-crossing point data S912 is 0 or 2, i.e., when there is no zero-crossing point, the extraction pulse S917 and the data selection pulse S916 are generated at times T1008, T1009, and T1010, at intervals of the extraction interval data S915.

At time T1011, since there is a zero-crossing point between the binary interpolation signal S910b and the subsequent binary original signal S910a, the phase shift amount data S913 is calculated and accordingly a value of 0 is obtained. Thus, the correction amount data S914 also has a value of 0, thereby generating the extraction pulse S917 and the data selection pulse S916 at time T1012.

Since there is no zero-crossing point during a period from time T1013 to time T1014, the extraction pulse S917 and the data selection pulse S916 are generated at each time.

During a period from time T1014 to time T1016, while there is a zero-crossing point at time T1015, the phase shift amount data S913 and the correction amount data S914 are 0, and thus the extraction interval will not be corrected, and the extraction pulse S917 and the data selection pulse S916 are generated at time T1016.

During a period from time T1016 to time T1018, there is a zero-crossing point at time T1017. At time T1016, the interpolation signal CP58 is selected on the basis of the extraction pulse S917 shown in FIG. 10(k) and the data selection pulse S916 shown in FIG. 10(l), whereby data of the phase shift amount between the zero-crossing point at time T1017 and the extraction pulse at time T1016 has a value of 3, and accordingly the correction amount data S914 has a value of −2. Therefore, the corrected extraction interval data S915 has a value of 8.09, and accordingly the extraction pulse S917 and the data selection pulse S916 are generated at time T1018.

In cases where there is no zero-crossing point, the extraction pulse S917 and the data selection pulse S916 are generated in the same manner at times T1019 and T1020.

Now, a description will be given of a case where a normal transmission signal is shifted in phase due to group delay or the like with reference to FIG. 10(a). In FIG. 10(a), the normal transmission signal is leaded in phase.

At time T1021, when the extraction pulse S917 and the data selection pulse S916 are generated such that the original signal SPn is selected, the subsequent extraction pulse S917 and data selection pulse S916 are generated such that the original signal SPn+5 at time T1022 is selected. Further, since there exists a zero-crossing point between the interpolation signal CPn+5 at time T1022 and the original signal SPn+6 at time T1023, the calculated phase shift amount data S913 has a value of 1. Therefore, the correction amount data S914 has a value of −4, and thus the corrected extraction interval data S915 has a value of 6.09, i.e., 6 when being rounded to the nearest integer, thereby generating the extraction pulse S917 and the data selection pulse S916 at time T1024.

By similarly carrying out the same processes as those described above every time when there exists a zero-crossing point, the phase shift amount data S913, the correction amount data S914, and the corrected extraction interval data S915 are calculated, whereby the extraction pulse S917 and the data selection pulse S916 are generated. Accordingly, when phase lead occurs in text broadcast data as shown in FIG. 10(a), the amount of the phase lead is corrected by correcting the extraction interval, whereby text broadcast data S918 can be correctly extracted from the inputted video signal, without an extraction error occurring in the extraction circuit 918.

Then, the extracted text broadcast data S918 is decoded by the decoding circuit 919, and obtained data is outputted to a display circuit (not shows). Thus, the display depending on the type of the text broadcast can be realized.

The data signal extraction apparatus according to the fourth embodiment is provided with the data interpolation circuit 908 for generating interpolation data that interpolate a digital video signal to obtain data corresponding to an integral multiple of the signal, and it detects the position of a text broadcast signal in binary signals that are obtained by binarizing the digital video signal and the interpolation data in the binarization circuit 910, and generates an extraction pulse that indicates the detected position of the data as a data extraction position. Therefore, this data signal extraction apparatus can extract data from a signal including distortion in the transmission system resulting from group delay or the like with higher accuracy, without increasing the circuit scale.

Further, this apparatus determines the type of text broadcast system, and generates the extraction pulse on the basis of the type and the frequency of the sampling clock. Therefore, not only European teletext broadcast, but also VPS, WSS, Japanese text-multiplexed broadcast, Electric Program Guides (abbreviated as EPG), US closed caption broadcast can be adaptively extracted. Accordingly, this text broadcast data extraction apparatus can handle global text broadcast systems.

In this fourth embodiment, double interpolation by which data are interpolated to have a doubled amount is employed as the interpolation by the data interpolation circuit, while this apparatus may apply to n-fold interpolation (n is an integer) such as 3-fold interpolation, 4-fold interpolation, 5-fold interpolation, or 8-fold interpolation. When "n" has a larger value, the binary interpolation signal S910b outputted from the binarization circuit 910 is increased, resulting in a higher accuracy.

Further, in this fourth embodiment, the linear interpolation is employed as the interpolation method, while the same effect can be achieved even when other method such as secondary convolution interpolation or Lagrange interpolation is employed.

Embodiment 5

A data signal extraction apparatus according to a fifth embodiment will be described with reference to FIGS. 11 and 12.

Figure 11:
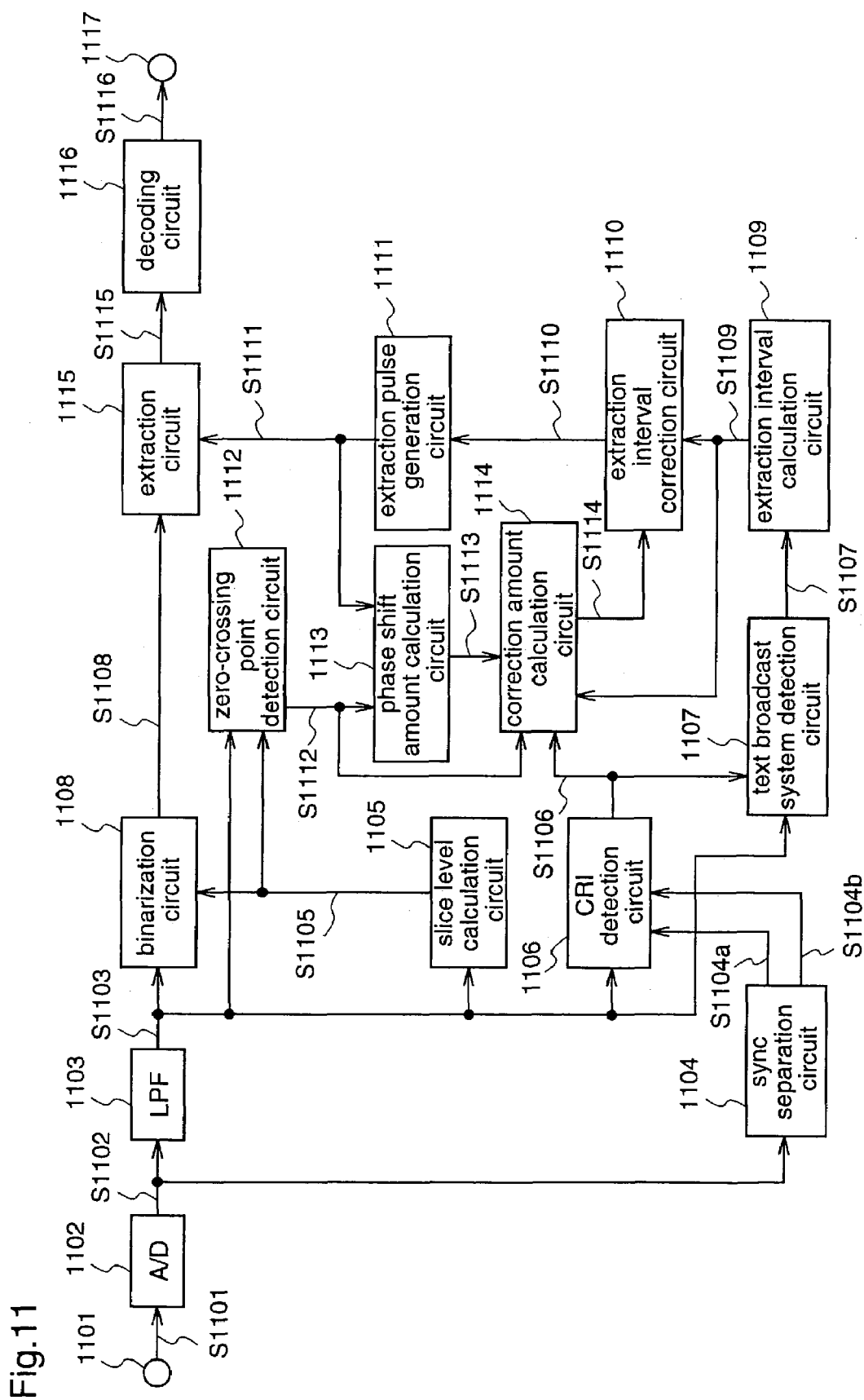
FIG. 11 is a block diagram illustrating a construction of a data signal extraction apparatus according to a fifth embodiment.

FIG. 11 is a block diagram illustrating a construction of the data signal extraction apparatus according to the fifth embodiment.

In FIG. 11, an analog video signal S1101 including text broadcast data which are superimposed upon a vertical blanking interval is inputted through a video signal input terminal 1101.

An A/D converter 1102 samples the analog video signal S1101 based on a predetermined sampling clock fs (MHz) to be converted into a digital video signal S1102, and outputs the obtained digital video signal S1102 to a low-pass filter (LPF) 1103 and a sync separation circuit 1104.

The LPF 1103 subjects the inputted digital video signal S1102 to noise elimination, and outputs the obtained signal to a slice level calculation circuit 1105, a clock run-in (CRI) detection circuit 1106, a binarization circuit 1108, and a zero-crossing point detection circuit 1112.

The sync separation circuit 1104 separates a horizontal synchronizing signal S1104a and a vertical synchronizing signal S1104b from the inputted digital video signal S1102, and outputs the separated signals S1104a and S1104b to the CRI detection circuit 1106. Here, the horizontal synchronizing signal S1104a and the vertical synchronizing signal S1104b are employed to obtain positions of the CRI period and the like.

The slice level calculation circuit 1105 calculates an optimum slice level S1105 for text broadcast data in a predetermined line and a predetermined position in the digital video signal S1103 that has been subjected to the noise elimination, and outputs the calculated slice level S1105 to the binarization circuit 1108 and the zero-crossing point detection circuit 1112.

The CRI detection circuit 1106 detects the position of the CRI period in the digital video signal S1103 that has been subjected to the noise elimination, using the vertical synchronizing signal S1104b and the horizontal synchronizing signal S1104a, and outputs a CRI detection signal S1106 to a text broadcast system detection circuit 1107 and a correction amount calculation circuit 1114.

The text broadcast system detection circuit 1107 calculates the CRI cycle of the digital video signal S1103 that has been subjected to the noise elimination, in accordance with the CRI detection signal S1106, then determines the type of the text broadcast system on the basis of the calculated cycle, and outputs a text broadcast system pulse S1107 to an extraction interval calculation circuit 1109.

The binarization circuit 1108 converts the digital video signal S1103 that has been subjected to the noise elimination, into a binary signal S1108 that is composed of 0 and 1, based on the slice level S1105 calculated by the slice level calculation circuit 1105, and outputs the obtained binary signal S1108 to an extraction circuit 1115.

The extraction interval calculation circuit 1109 calculates optimum extraction interval data S1109 on the basis of the text broadcast system pulse S1107, and outputs the calculated extraction interval data S1109 to an extraction interval correction circuit 1110 and the correction amount calculation circuit 1114. Here, the extraction interval data S1109 can be calculated from a ratio between the sampling clock fs and a transmission clock of various text broadcast systems. In other words, when the type of the text broadcast system and the frequency of the sampling clock are obtained, the extraction interval data S119 can be calculated. Here, A unit of the extraction interval data S1109 is the number of the sampling clocks.

The extraction interval correction circuit 1110 corrects extraction interval data S1109 on the basis of the correction amount data S1114, and outputs corrected extraction interval data S1110 to an extraction pulse generation circuit 1111.

The extraction pulse generation circuit 1111 generates an extraction pulse S1111 at an optimum position on the basis of the corrected extraction interval data, and outputs the generated pulse S1111 to a phase shift amount calculation circuit 1113 and the extraction circuit 1115.

The zero-crossing point detection circuit 1112 detects a position at which the digital video signal S1103 coincides with the slice level S1105, and outputs the detected position as zero-crossing point data S1112 to the phase shift amount calculation circuit 1113 and the correction amount calculation circuit 1114.

The phase shift amount calculation circuit 1113 calculates phase shift amount data S1113 on the basis of the difference in phase between the zero-crossing point data S1112 and the extraction pulse S1110, and outputs the calculated phase shift amount data S1113 to the correction amount calculation circuit 1114. Here, a unit of the phase shift amount data S1113 is the number of the sampling clocks.

The correction amount calculation circuit 1114 calculates extraction interval correction amount data S1114 on the basis of the phase shift amount data S1113, and outputs the calculated correction amount data S1114 to the extraction interval correction circuit 1110. Here, the correction amount calculation circuit 1114 may be constructed of a lookup table that varies according to the phase shift amount data S1113.

Here, the correction amount data S1114 that is calculated on the basis of the phase shift amount data S1113 is calculated in following steps.

In the case of a normal signal including no phase delay or phase lead, the difference in phase between the zero-crossing point data S1112 and the position of the extraction pulse S1111, i.e., the phase shift amount data S1113 has a value that is equal to one-half the extraction interval data S1109.

When the signal is delayed in phase, the phase shift amount data S1113 is larger than one-half the extraction interval data S1109, while when the signal is leaded in phase, the phase shift amount data S1113 is smaller than one-half the extraction interval data. Therefore, the correction amount calculation circuit 1114 calculates the correction amount data S1114 by subtracting the phase shift amount data S1113 from one-half the extraction interval data S1109. Thus, the phase is delayed when the correction amount data S1114 has a positive number, while the phase is leaded when the correction amount data S1114 has a negative number.

When the correction amount data S1114 is calculated by subtracting one-half the extraction interval data S1119 from the phase shift amount data S1113, the phase is leaded when the correction amount data S1114 has a positive number, while the phase is delayed when the correction amount data S1114 has a negative number.

The extraction circuit 1115 extracts text broadcast data S1115 from the binary signal S1108 in accordance with the extraction pulse S1111, and outputs the extracted data S1115 to a decoding circuit 1116.

The decoding circuit 1116 converts the serial text broadcast data S1115 that has been extracted by the extraction circuit 1115 into parallel data, then performs a decoding process such as error correction depending on the type of the text broadcast, and outputs decoded data S1116 to outside through an output terminal 1117.

The operation of the data signal extraction apparatus according to the fifth embodiment, which is constructed as described above, will be described with reference to FIG. 12. It is assumed here that the type of the text broadcast data is teletext broadcast.

Figure 12:
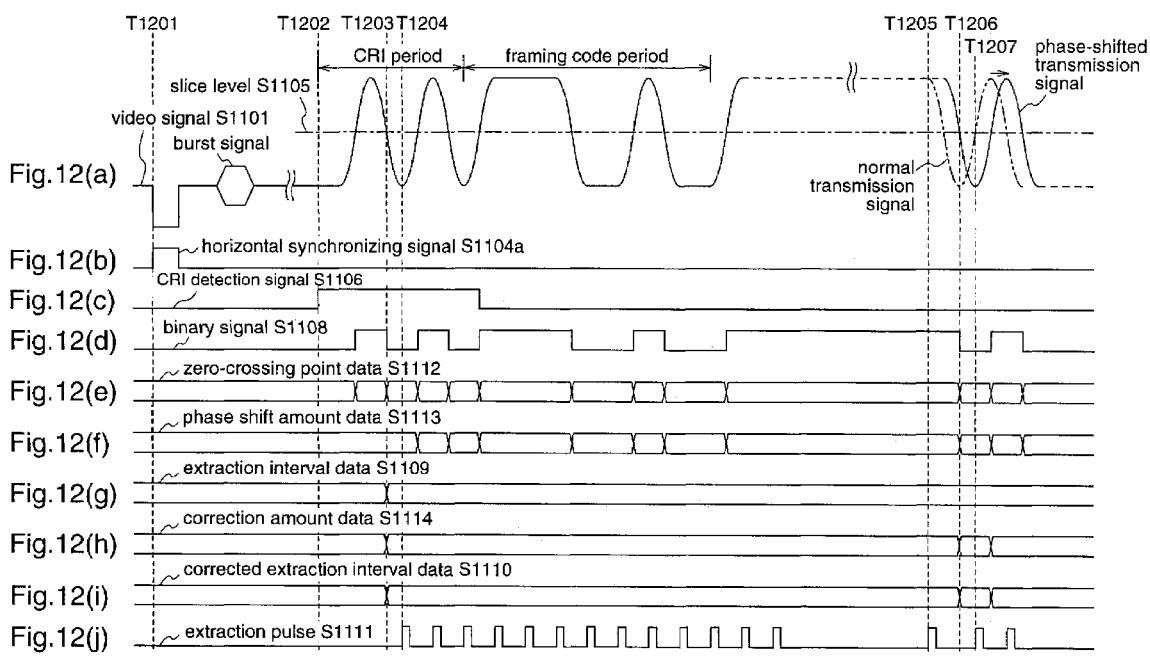
FIGS. 12(a) to 12(j) are timing charts for explaining an operation of the data signal extraction apparatus according to the fifth embodiment.
Figure 13:
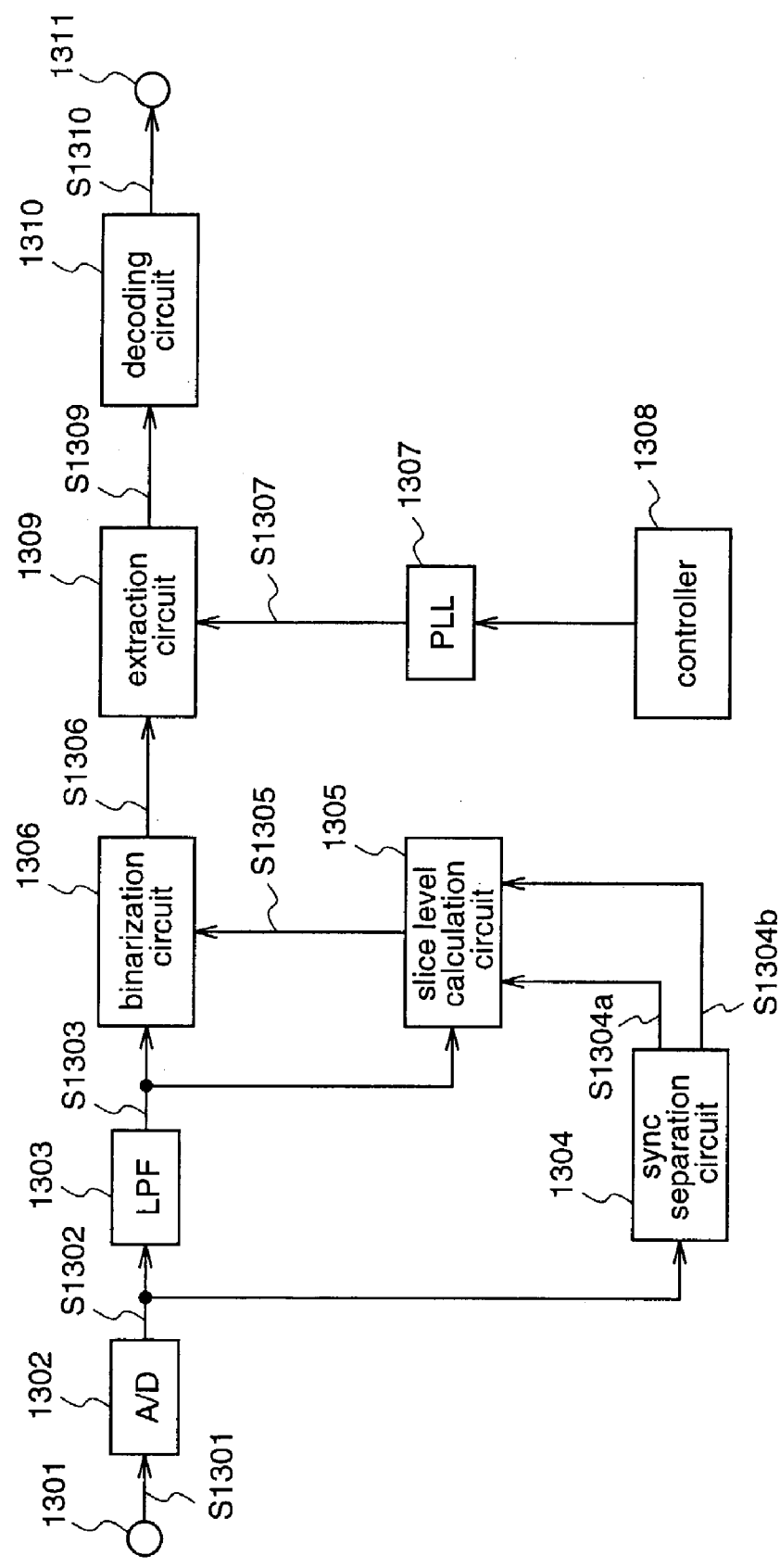
FIG. 13 is a block diagram illustrating a construction of a conventional data signal extraction apparatus.

FIG. 12 are timing charts for explaining the operation of the data signal extraction apparatus according to the fifth embodiment. In the figures, FIG. 12(a) shows an analog videos signal S1101, FIG. 12(b) shows a horizontal synchronizing signal S1104a, FIG. 12(c) shows a CRI detection signal S1106, FIG. 12(d) shows a binary signal S1108, FIG. 12(e) shows zero-crossing point data S1112, FIG. 12(f) shows phase shift amount data S1113, FIG. 12(g) shows extraction interval data S1109, FIG. 12(h) shows correction amount data S1114, FIG. 12(i) shows corrected extraction interval data S1110, and FIG. 12(j) shows an extraction pulse S1111.

The analog video signal S1101 that is inputted through a video signal input terminal 1101 includes, as shown in FIG. 12(a), a horizontal synchronizing signal, a burst signal, a CRI period, a framing code period indicating the type of text broadcast and the like, and text broadcast data.

At time T1201, a horizontal synchronizing signal S1104a as shown in FIG. 12(b) is separated by the sync separation circuit 1104, from a digital video signal S1102 that is obtained by digitizing the analog video signal S1101 in the A/D converter 1102.

At time T1202, the CRI detection circuit 1106 detects a CRI period from a signal S1103 that is obtained by subjecting the digital video signal S1102 to noise elimination by means of the LPF 1103, thereby generating a CRI detection signal S1106 as shown in FIG. 12(c). Further, the binarization circuit 1108 binarizes the signal S1103 that is obtained by performing the noise elimination, based on a slice level S1105 calculated by the slice level calculation circuit 1105, thereby to generate a binary signal S1108 as shown in FIG. 12(d).

At time T1203, when a position at which the video signal coincides with the slice level S1105, i.e., a position at which the slice level S1105 is intersected by the video signal, is detected by the zero-crossing point detection circuit 1112, zero-crossing point data S1112 as shown in FIG. 12(e) is generated. Here, the value of the zero-crossing point data S1112 is an integer when the slice level S1105 coincides with a sampling point, while the value of the zero-crossing point data S1112 normally includes a decimal fraction when the slice level does not coincides a sampling point, because the zero-crossing point position is calculated by interpolating the data using sampling points which are forward and backward of an intercept with the slice level S1105.

At time T1203, the interval between the zero-crossing point data S1112, i.e., the cycle is calculated during a period in which the CRI detection signal S1106 is 1, and when the cycle matches any text broadcast system, in this case when the cycle matches the teletext broadcast, the extraction interval calculation circuit 1109 generates extraction interval data S1109 as shown in FIG. 12(g).

At time T1204, the extraction pulse generation circuit 1111 generates an extraction pulse S1111 as shown in FIG. 12(j) at a position corresponding to one-half the extraction interval data starting from time T1203 corresponding to a position indicated by the zero-crossing point data S1112. Then, the phase shift amount calculation circuit 1113 calculates the difference in phase between the zero-crossing point data S1112 shown in FIG. 12(e) and the extraction pulse S1111 shown in FIG. 12(j), as the phase shift amount data S1113 as shown in FIG. 12(f), every time when the zero-crossing point data S1112 is detected.

When no waveform distortion such as phase shift resulting from group delay or the like, occurs in the analog video signal S1101 including text broadcast data which are superimposed thereon, the phase shift amount data S1113 has a value that is equal to one-half the extraction interval data S1109. More specifically, when the correction amount calculation circuit 1114 calculates the correction amount data S1114 by subtracting one half the extraction interval data S1109 from the phase shift amount data S1113, the correction amount data S1114 shown in FIG. 12(h) has a value of 0. Therefore, no phase shift occurs during a period from time T1204 to time T1205, and thus the extraction pulse S1111 as shown in FIG. 12(i) is generated at intervals of the extraction interval data S1109 starting from an extraction pulse generated at time T1204.

At time T1205, when phase shift occurs in the analog video signal S1101 due to group delay or the like, the phase shift amount data S1113 between the extraction pulse S1111 at time T1205 and the zero-crossing point data S1112 at time T1206 does not have the same value as one-half the extraction interval data S1109 but has a value that is shifted by several clocks. Therefore, the correction amount calculation circuit 1114 calculates the correction amount on the basis of the phase shift amount data S1113, Here, it is assumed that a value of one half the extraction interval data S1109 (hereinafter, referred to as a normal value) is øn and the correction amount data S1114 is obtained by subtracting the normal value øn from the phase shift amount data S1113. In the case of phase delay, the phase shift amount data S1113 is larger than the normal value øn, and accordingly the correction amount has a positive number. On the other hand, in the case of phase lead, since the phase shift amount data S1113 is smaller than the normal value øn, the correction amount has a negative number.

When the corrected extraction interval data S1110 is calculated by adding the correction amount data S1114 that has been obtained in the above-mentioned manner, to the extraction interval data S1109, the corrected extraction interval data S1110 in the case of phase delay as shown in FIG. 12 has a value that is larger than the extraction interval data S1109, and the extraction pulse S1111 is generated at time T1207. Thus, when the phase delay occurs in the text broadcast data, the extraction interval is corrected, whereby the phase delay amount at time T1207 is corrected, and accordingly the text broadcast data S1115 can be correctly extracted from the inputted video signal, without an extraction error occurring in the extraction circuit 1114.

Then, the extracted text broadcast data S1115 is decoded by the decoding circuit 1116 and outputted to a display circuit (not shown). Thereby, display depending on the type of text broadcast can be realized.

While the description has been given of the phase delay with reference to FIG. 12, the corrected extraction interval data S1110 in the case of phase lead is smaller than the extraction interval data S1109, and accordingly text broadcast data can be correctly extracted from the inputted video signal by correcting the phase lead amount.

While, in the description of FIG. 12, the correction amount is obtained by subtracting the normal value øn from the phase shift amount data S1113, the same effect can be achieved also when the correction amount is obtained by subtracting the phase shift amount data S1113 from the normal value øn and then the corrected extraction interval data S1110 is obtained by subtracting the correction amount from the extraction interval data S1109.

In addition, also in cases where the text broadcast signal is not a teletext signal, the correct extraction can be realized in the same manner as described above, i.e., by determining the type of the text broadcast, then calculating the extraction interval data S1109 depending on the type, and correcting the extraction interval adaptively when the phase shift occurs.

In the data signal extraction apparatus according to the fifth embodiment, when phase shift occurs in an inputted video signal S1101 that is serially transmitted from outside, the phase shift amount S1113 is calculated instantaneously, and then the extraction interval data S1109 is corrected on the basis of the phase shift amount S1113, thereby generating the extraction pulse S1111. Therefore, when the signal is phase shifted in the middle, the phase shift amount is instantaneously calculated, and the extraction interval data is adjusted on the basis of the phase shift amount, thereby generating the extraction pulse at an optimum position. Consequently, this data signal extraction apparatus can extract data from signals that include distortion in the transmission system resulting from group delay or the like, with high accuracy, without the circuit scale being increased.

Further, this data signal extraction apparatus determines the type of the text broadcast system, and generates an extraction pulse on the basis of the type and the frequency of the sampling clock. Therefore, not only European teletext broadcast but also VPS, WSS, Japanese text-multiplexed broadcast, Electric Program Guide (abbreviated as EPG), and US closed caption broadcast can be adaptively extracted. Thus, this data signal extraction apparatus according to the fifth embodiment can handle global text broadcast systems.

What is claimed is:

1. A data signal extraction apparatus that extracts a predetermined data signal from an inputted video signal that is serially transmitted from outside, comprising:

an A/D conversion unit for sampling the inputted video signal based on a sampling clock of a predetermined frequency, to be converted into a digital video signal;

a slice level calculation unit for calculating a slice level that is used to evaluate a value of the inputted video signal as 0 or 1, on the basis of the digital video signal;

a binarization unit for converting the digital video signal into a binary signal using the slice level;

an extraction interval calculation unit for calculating an extraction interval value to extract the predetermined data signal from the digital video signal;

a zero-crossing point detection unit for detecting a zero-crossing point at which the binary signal changes from 0 to 1, or from 1 to 0;

a phase shift amount calculation unit for calculating an amount of phase shift in the data signal, on the basis of the zero-crossing point;

a correction amount calculation unit for calculating an amount of correction for the extraction interval value, according to the phase shift amount;

an extraction interval correction unit for correcting the extraction interval value according to the correction amount, to obtain a corrected extraction interval value;

an extraction pulse generation unit for calculating a position of the data signal in the binary signal successively from a predetermined extraction position, being spaced at intervals that are close to the corrected extraction interval value, and generating an extraction pulse designating the position of the data as a data extraction position; and an extraction unit for extracting the data signal from the binary signal in accordance with the extraction pulse.

2. The data signal extraction apparatus of claim 1 wherein the data signal is a text broadcast signal that is superimposed upon a vertical blanking interval of the inputted video signal.

3. The data signal extraction apparatus of claim 1 wherein the extraction interval calculation unit detects a transmission clock synchronizing period for establishing synchronization with a transmission clock of the data signal, from the digital video signal, and calculates an extraction interval value for the data signal on the basis of a cycle of the transmission clock, during the detected transmission clock synchronizing period.

4. The data signal extraction apparatus of claim 1 wherein the phase shift amount calculation unit calculates the number of the sampling clocks by obtaining a difference between the zero-crossing point and the extraction pulse that is located forward of the zero-crossing point, and regards the calculated number of the sampling clocks as the phase shift amount.

5. The data signal extraction apparatus of claim 1 wherein the correction amount calculation unit calculates the correction amount by obtaining a difference between the phase shift amount calculated by the phase shift amount calculation unit and one half the extraction interval value calculated by the extraction interval calculation unit.

6. The data signal extraction apparatus of claim 1 wherein the extraction interval correction unit calculates the extraction interval correction value by adding or subtracting the correction amount to or from the extraction interval value.

7. The data signal extraction apparatus of claim 1 further including:

a CRI detection unit for detecting a period of clock run-in in the digital video signal; and a text broadcast system detection unit for calculating a clock run-in cycle of the inputted video signal during the clock run-in period, and detecting a type of a text broadcast system of the inputted video signal on the basis of the calculated cycle, wherein said extraction interval calculation unit calculates the extraction interval value on the basis of the detected type of the text broadcast system.

8. A data signal extraction apparatus that extracts a predetermined data signal from an inputted video signal that is serially transmitted from outside, comprising:

an A/D conversion unit for sampling the inputted video signal based on a sampling clock of a predetermined frequency, to be converted into a digital video signal;

a slice level calculation unit for calculating a slice level that is used to evaluate the inputted video signal as 0 or 1, on the basis of the digital video signal;

a binarization unit for converting the digital video signal into a binary signal using the slice level;

an extraction interval calculation unit for calculating an extraction interval value to extract the predetermined data signal from the digital video signal;

a zero-crossing point detection unit for detecting a zero-crossing point at which the binary signal changes from 0 to 1, or from 0 to 1;

a counter unit for counting the number of the sampling clocks;

a counter value capture unit for capturing a count value of the counter unit in response to the detection of the zero-crossing point;

an arithmetic unit for calculating an amount of phase shift in the signal using the counter value that is captured by the counter value capture unit and the extraction interval value, and correcting the extraction interval value on the basis of the phase shift amount;

a comparison unit for comparing a result of the arithmetic by the arithmetic unit and the counter value of the counter unit with each other;

an extraction pulse generation unit for extracting an extraction pulse on the basis of an output from the comparison unit; and an extraction unit for extracting the predetermined data signal from the binary signal, in accordance with the extraction pulse.

9. The data signal extraction apparatus of claim 8 wherein the data signal is a text broadcast signal that is superimposed upon a vertical blanking interval of the video signal.

10. The data signal extraction apparatus of claim 8 wherein the extraction interval calculation unit detects a transmission clock synchronizing period for establishing synchronization with a transmission clock of the data signal, from the digital video signal, and calculates an extraction interval value for the-data signal on the basis of a cycle of the transmission clock, during the detected transmission clock synchronizing period.

11. The data signal extraction apparatus of claim 8 wherein the counter unit is reset in accordance with an input of the extraction pulse.

12. The data signal extraction apparatus of claim 8 wherein the arithmetic unit obtains a difference between the counter value captured by the counter value capture unit and one half the extraction interval value, as the phase shift amount, and calculates the extraction correction interval value by adding or subtracting the phase shift amount to or from the extraction interval value, to correct the extraction interval value using the extraction interval correction value.

13. The data signal extraction apparatus of claim 8 wherein the comparison unit compares the counter value obtained from the counter unit and the extraction interval correction value obtained by the arithmetic unit, then generates a comparison pulse when the counter value and the extraction interval correction value coincides with each other, and outputs the generated comparison pulse to the extraction pulse generation unit.

14. The data signal extraction apparatus of claim 8 further including:
a CRI detection unit for detecting a period of clock run-in in the digital video signal; and
a text broadcast system detection unit for calculating a clock run-in cycle of the inputted video signal during the clock run-in period, and detecting a type of a text broadcast system of the inputted video signal on the basis of the calculated cycle, wherein
said extraction interval calculation unit calculates the extraction interval value on the basis of the detected type of the text broadcast system.

15. A data signal extraction apparatus that extracts a predetermined data signal from an inputted video signal that is serially transmitted from outside, comprising:
an A/D conversion unit for sampling the inputted video signal based on a sampling clock of a predetermined frequency, to be converted into a digital video signal;
a slice level calculation unit for calculating a slice level that is used to evaluate the inputted video signal as 0 or 1, on the basis of the digital video signal;
a binarization unit for converting the digital video signal into a binary signal using the slice level;
a storage unit for storing the binary signal;
an extraction interval calculation unit for calculating an extraction interval value to extract the predetermined data signal from the digital video signal;
a zero-crossing point address detection unit for detecting an address of a zero-crossing point at which the binary signal stored in the storage unit changes from 0 to 1, or from 1 to 0;
an address calculation unit for calculating an extraction address corresponding to the predetermined data signal, in the binary signal stored in the storage unit, on the basis of the extraction interval value;
an initial address calculation unit for calculating an initial address using the zero-crossing point address and the extraction interval value;
an address correction value calculation unit for calculating an address correction value to correct the extraction address when phase shift occurs in the inputted video signal; and
an address correction unit for correcting the extraction address obtained by the address calculation unit, on the basis of the address correction value, wherein
said storage unit extracts the predetermined data signal from the stored digital video signal, on the basis of the extraction address corrected by the address correction unit.

16. The data signal extraction apparatus of claim 15 wherein
the data signal is a text broadcast signal that is superimposed upon a vertical blanking interval of the inputted video signal.

17. The data signal extraction apparatus of claim 15 wherein
the extraction interval calculation unit detects a transmission clock synchronizing period for establishing synchronization with a transmission clock of the predetermined data signal, from the digital video signal, and calculates an extraction interval value for the data signal on the basis of a cycle of the transmission clock during the detected transmission clock synchronizing period.

18. The data signal extraction apparatus of claim 15 wherein
the initial address calculation unit calculates the initial address by adding one half the extraction interval value to the zero-crossing point address.

19. The data signal extraction apparatus of claim 15 wherein
the address correction value calculation unit calculates the address correction value by obtaining a difference between the extraction address calculated by the address calculation unit and the zero-crossing point address.

20. The data signal extraction apparatus of claim 15 wherein
the address correction unit corrects the extraction address by adding or subtracting the address correction value to or from the extraction address calculated by the address calculation unit.

21. The data signal extraction apparatus of claim 15 further including:
a CRI detection unit for detecting a period of clock run-in in the digital video signal;
a CRI address calculation unit for calculating a start address and an end address of the clock run-in period; and
a text broadcast system detection unit for calculating a clock run-in cycle of the inputted video signal during the clock run-in period, and detecting a type of a text broadcast system of the inputted video signal on the basis of the calculated cycle, wherein
said initial address calculation unit calculates an initial address of the zero-crossing point in the clock run-in period on the basis of the addresses outputted from the CRI address calculation unit, and
said extraction interval calculation unit calculates the extraction interval value according to the detected type of the text broadcast system.

22. A data signal extraction apparatus that extracts a predetermined data signal from an inputted video signal that is serially transmitted from outside, comprising:
an A/D conversion unit for sampling the inputted video signal based on a sampling clock of a predetermined frequency, to be converted into a digital video signal;
an interpolation unit for interpolating the digital video signal so as to multiply the amount of data by $\alpha$ ($\alpha$ is an integer), thereby generating interpolated data;
a slice level calculation unit for calculating a slice level that is used to evaluate the inputted video signal as 0 or 1, on the basis of the digital video signal;
a binarization unit for converting the digital video signal and the interpolated data into binary signals using the slice level;
an extraction interval calculation unit for calculating an extraction interval value to extract the predetermined data signal from the digital video signal;
a zero-crossing point detection unit for detecting a zero-crossing point at which the binary signal of the digital video signal or the binary signal of the interpolated data changes from 0 to 1, or from 1 to 0;
a phase shift amount calculation unit for calculating an amount of phase shift in the data signal, on the basis of the zero-crossing point;
a correction amount calculation unit for calculating an amount of correction for the extraction interval value, according to the phase shift amount;

an extraction interval correction unit for correcting the extraction interval value on the basis of the correction amount, to obtain a corrected extraction interval value;

an extraction pulse generation unit for calculating a position of the data signal in the binary signal of the digital video signal or the binary signal of the interpolated data successively from a predetermined extraction position, being spaced at intervals that are close to the corrected extraction interval value, and generating an extraction pulse designating the position of the data signal as a data extraction position;

a data selection pulse generation unit for generating a data selection pulse on the basis of the corrected extraction interval value, to select one of the binary signal of the digital video signal and the binary signal of the interpolated data;

a data selection unit for selecting one of the binary signals in accordance with the data selection pulse; and an extraction unit for extracting the data signal from the binary signal selected by the data selection unit, in accordance with the extraction pulse.

23. The data signal extraction apparatus of claim 22 wherein
the data signal is a text broadcast signal that is superimposed upon a vertical blanking interval of the inputted video signal.

24. The data signal extraction apparatus of claim 22 wherein
the extraction interval calculation unit detects a transmission clock synchronizing period for establishing synchronization with a transmission clock of the data signal, from the digital video signal, and calculates an extraction interval value for the data signal on the basis of a cycle of the transmission clock during the detected transmission clock synchronizing period.

25. The data signal extraction apparatus of claim 22 wherein
the phase shift amount calculation unit calculates the number of the sampling clocks by obtaining a difference between the zero-crossing point and the extraction pulse that is located forward of the zero-crossing point, and multiplies the calculated number of the sampling clocks by $\alpha 0$ to obtain the phase shift amount.

26. The data signal extraction apparatus of claim 22 wherein
the correction amount calculation unit calculates the correction amount by obtaining a difference between the phase shift amount calculated by the phase shift amount calculation unit and one half the extraction interval value calculated by the extraction interval calculation unit.

27. The data signal extraction apparatus of claim 22 wherein
the extraction interval correction unit obtains the extraction interval correction value by adding or subtracting the correction value to or from the extraction interval value.

28. The data signal extraction apparatus of claim 22 further including:
a CRI detection unit for detecting a period of clock run-in of the digital video signal; and
a text broadcast system detection unit for calculating a clock run-in cycle of the inputted video signal during the clock run-in period, and detecting a type of a text broadcast system of the inputted video signal on the basis of the calculated cycle, wherein said extraction interval calculation unit calculates the extraction interval value according to the detected type of the text broadcast system.

29. A data signal extraction apparatus that extracts a predetermined data signal from an inputted video signal that is serially transmitted from outside, comprising:
an A/D conversion unit for sampling the inputted video signal based on a sampling clock of a predetermined frequency, to be converted into a digital video signal;

a slice level calculation unit for calculating a slice level that is used to evaluate the inputted video signal as 0 or 1 on the basis of the digital video signal;

a binarization unit for converting the digital video signal into a binary signal using the slice level;

an extraction interval calculation unit for calculating an extraction interval value to extract the data signal from the digital video signal;

a zero-crossing point position detection unit for detecting a zero-crossing point position at which the digital video signal intersects the slice level, using the digital video signal and the slice level;

a phase shift amount calculation unit for calculating an amount of phase shift in the data signal on the basis of the zero-crossing point position;

a correction amount calculation unit for calculating an amount of correction for the extraction interval value according to the phase shift amount;

an extraction interval correction unit for correcting the extraction interval value on the basis of the correction amount, to obtain a corrected extraction interval value;

an extraction pulse generation unit for calculating a positions of the data signal in the binary signal successively from a predetermined extraction position, spaced at intervals that are close to the corrected extraction interval value, and generating an extraction pulse designating the position of the data signal as a data extraction position; and an extraction unit for extracting the data signal from the binary signal in accordance with the extraction pulse.

30. The data signal extraction apparatus of claim 29 wherein
the data signal is a text broadcast signal that is superimposed upon a vertical blanking interval of the inputted video signal.

31. The data signal extraction apparatus of claim 29 wherein
the extraction interval calculation unit detects a transmission clock synchronizing period for establishing synchronization with a transmission clock of the data signal, from the digital video signal, and calculating an extraction interval value for the data signal on the basis of a cycle of the transmission clock, during the detected transmission clock synchronizing period.

32. The data signal extraction apparatus of claim 29 wherein
the phase shift amount calculation unit calculates the number of the sampling clocks by obtaining a difference between the zero-crossing point position and the extraction pulse that is located forward of the zero-crossing point position, and regards the calculated number of the sampling clock as the phase shift amount.

33. The data signal extraction apparatus of claim 29 wherein
the correction amount calculation unit obtains the correction amount by calculating a difference between the phase shift amount calculated by the phase shift amount calculation unit and one half the extraction interval value calculated by the extraction interval calculation unit.

34. The data signal extraction apparatus of claim 29 wherein
the extraction interval correction unit calculates the corrected extraction interval value by adding or subtracting the correction amount to or from the extraction interval value.

35. The data signal extraction apparatus of claim 29 further including:
a CRI detection unit for detecting a period of clock run-in in the digital video signal; and
a text broadcast system detection unit for calculating a clock run-in cycle of the inputted video signal during the clock run-in period, and detecting a type of a text broadcast system of the inputted video signal on the basis of the calculated cycle, wherein
said extraction interval calculation unit calculates the extraction interval value according to the detected type of the text broadcast system.

* * * * *